United States Patent
Xu et al.

(10) Patent No.: US 6,784,644 B2
(45) Date of Patent: Aug. 31, 2004

(54) MULTIPHASE CLAMP COUPLED-BUCK CONVERTER AND MAGNETIC INTEGRATION

(75) Inventors: Peng Xu, Sleepy Hollow, NY (US); Kaiwei Yao, Blacksburg, VA (US); Fred C. Lee, Blacksburg, VA (US); Mao Ye, Blacksburg, VA (US); Jia Wei, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 185 days.

(21) Appl. No.: 10/079,819

(22) Filed: Feb. 22, 2002

(65) Prior Publication Data

US 2002/0118000 A1 Aug. 29, 2002

Related U.S. Application Data

(60) Provisional application No. 60/270,170, filed on Feb. 22, 2001.

(51) Int. Cl.$^7$ .......................... G05F 1/613; H02H 7/122
(52) U.S. Cl. .................... 323/225; 323/255; 323/259; 363/56.12
(58) Field of Search .................. 363/39, 89, 125, 363/56.12; 323/222, 225, 247, 255, 259, 250, 282, 284; 361/91.7; 315/209 R

(56) References Cited

U.S. PATENT DOCUMENTS

| | | | | |
|---|---|---|---|---|
| 5,642,273 A | * | 6/1997 | Lai et al. | 363/56.12 |
| 5,982,106 A | * | 11/1999 | Bobel | 315/209 R |
| 6,445,600 B2 | * | 9/2002 | Ben-Yaakov | 363/39 |

* cited by examiner

Primary Examiner—Jessica Han
(74) Attorney, Agent, or Firm—Whitham, Curtis & Christofferson, P.C.

(57) ABSTRACT

Voltage regulation, transient response and efficiency of a voltage regulator module (VRM) is improved where short duty cycles are necessitated by large differentials of input and output voltage by including at least one clamping of a tap of an inductance in series with an output of each of a plurality of parallel branches or phases which are switched in a complementary fashion or providing coupling between inductors of respective phases. Such coupling between inductors is achieved in a small module with an integrated magnetic structure. Reduced component counts are achieved while deriving built-in input and output filters. Principals of the invention can be extended to isolation applications and push-pull forward converts, in particular. A lossless clamping circuit is also provided allowing spike currents to be suppressed while returning power to the output of the VRM.

27 Claims, 27 Drawing Sheets

MULTIPHASE CLAMP COUPLED-BUCK CONVERTER AND MAGNETIC INTEGRATION

CROSS-REFERENCE TO RELATED APPLICATIONS

This application claims priority to U.S. Provisional Application Serial No. 60/270,170, filed Feb. 22, 2001, the entire contents of which are hereby fully incorporated by reference.

BACKGROUND OF THE INVENTION

1. Field of the Invention

The present invention generally relates to power supplies and DC to DC converters and, more particularly, to multiphase power supplies and converters which operate at low output voltages and increased input to output voltage differentials.

2. Description of the Prior Art

Advances in microprocessor technologies impose challenges in designing power supplies. In particular, there has been a strong incentive to develop increased integration density since increases in performance in terms of signal propagation time, noise immunity, increased functionality per chip and the like can be achieved thereby as well as some improvements in manufacturing economy. However, to exploit the reduced signal propagation time, clock speeds have been increased; increasing dissipated power. As a consequence, to limit power dissipation, operating voltages have been decreased in modern designs and further reduction in operating voltage can be anticipated. At the same time, supply voltage tolerances have been decreased while potential transient power requirements have increased and will present even more stringent requirements in the future.

In order to deliver a highly accurate supply voltage to microprocessors, a dedicated DC/DC converter is usually placed in close physical and electrical proximity to the processor or other chip or module having such requirements. Such a converter is often provided in a modular form and is referred to as a voltage regulator module (VRM). Most common of the currently used VRM circuit topologies are multiphase (e.g. two or more phase) buck converters; the principal benefits of which are ripple voltage cancellation effect, efficiency, relatively small module size and the ability to use relatively inexpensive components. More specifically, the ripple cancellation effect between the phases allows use of small inductances to improve transient response and minimization of output filter capacitance. As is well-understood in the art, a ripple voltage is the voltage above the converter output voltage which drives input current to the output filter capacitor when the voltage is drawn down below the nominal converter output voltage by the load (represented in this case by a microprocessor or other chip or module).

Use of more than two phases can interleave the conductor currents between the individual phase channels and thereby greatly reduce the the total ripple currents flowing into the output capacitor(s). Such further reduction of ripple current by use of three or more phases allows use of even smaller inductors to improve transient response and allows a small capacitance to meet transient requirements. Reduced ripple voltage also allows more room for voltage deviations during transients since less of the voltage tolerance budget will be consumed by the ripple voltage.

As is well-understood, the total current that can be supplied by a DC/DC converter is a function of both the ripple voltage and its duty cycle. That is, in buck converter VRMs, such as the two phase buck converter shown in FIG. 1, the duty cycle, D, is the ratio of the output voltage $V_O$ to the input voltage, $V_{IN}$. In earlier VRMs, the input voltage and the output voltage both approximated 5 volts, in which case, the synchronous buck topology works very well to minimize the ripple voltage.

However, current microprocessors for desktop computers, workstations and and low-end servers require the VRMs to work with a 12 volt input while the microprocessor voltage will generally be reduced from the 5 volts required in earlier generations of microprocessors. In laptop computers, VRMs directly step down from the 16 to 24 volt battery charger voltage to a microprocessor voltage of 1.5 volts. It can be anticipated that future generations of microprocessors will operate at voltages well below 1 volt to further reduce power dissipation. Accordingly, the VRMs will be required to operate at very small duty cycles. It follows that the ripple voltage and current will thus be increased, even in converter topologies which provide a significant ripple cancellation effect. FIG. 2 shows the influence of duty cycle on the output current ripple for buck converters of different numbers of phases (normalized against the inductor current ripple at zero duty cycle. It can be seen that at small duty cycles where the current ripple reduction is poor, the benefits of increasing the number of phases of the buck converter is compromised, as well.

Further, study and simulation have shown that with very small duty cycles, both transient response and efficiency of multiphase buck converters suffer as well. FIG. 3 shows the measured efficiency comparison (including power losses in the power stage but excluding control and gate drive losses) between input voltages of 5 volts (D=0.3) and 12 volts (D=0.125). As can be seen, the 5 volt input VRM can achieve 87% efficiency at full load and 91% peak efficiency while the 12 volt input VRM can achieve only 81% efficiency at full load and 84.5% peak efficiency. In other words, the increase of duty cycle, D, from 0.125 to 0.3 increases full load efficiency by 6% and peak efficiency by 7%. The loss contributions indicate that the efficiency improvement at longer duty cycles is mainly caused by the reduced switching loss of the top switches (S1 and S3 of FIG. 1). The switching loss is proportional to the switching current and voltage stress. Therefore, higher differential input and output voltages result in higher switching losses and reduced efficiency.

In summary, while similarity of input and output voltages of VRMs and multiphase buck converters in particular in the past has yielded satisfactory performance and good efficiency, the current practical trends toward increased VRM input voltage and reduced output voltage compromises both of these principal qualities and can be expected to increase in the future. The problem and criticality of efficiency is also compounded since reduced efficiency implies increased power dissipation of the VRM in the physical proximity to the load/microprocessor (to limit ohmic voltage drop) increases the complexity and criticality of heat removal from both the VRM and the load. Perhaps more importantly, however, the increased ripple voltage/current at short duty cycles compromises transient response of the VRM.

SUMMARY OF THE INVENTION

It is therefore an object of the present invention to provide a VRM of increased efficiency without compromise of transient response.

It is another object of the invention to provide a voltage regulator module which can be fabricated at small size with relatively inexpensive component while achieving improved performance.

In order to accomplish these and other objects of the invention, a converter circuit and electronic device including a converter circuit and an integrated circuit powered thereby is provided in which the converter circuit comprises a plurality of branches switched in a complementary manner to define a plurality of phases, an inductor connected in series with an output of each said phase, and a clamping circuit connected to a tap of the inductor and/or an arrangement for providing coupling between respective inductors of respective neighboring ones of said plurality of phases.

BRIEF DESCRIPTION OF THE DRAWINGS

The foregoing and other objects, aspects and advantages will be better understood from the following detailed description of a preferred embodiment of the invention with reference to the drawings, in which:

FIG. 43 is a graphical plot comparison of efficiency of the circuit of FIG. 41.

DETAILED DESCRIPTION OF A PREFERRED EMBODIMENT OF THE INVENTION

Figure 1:
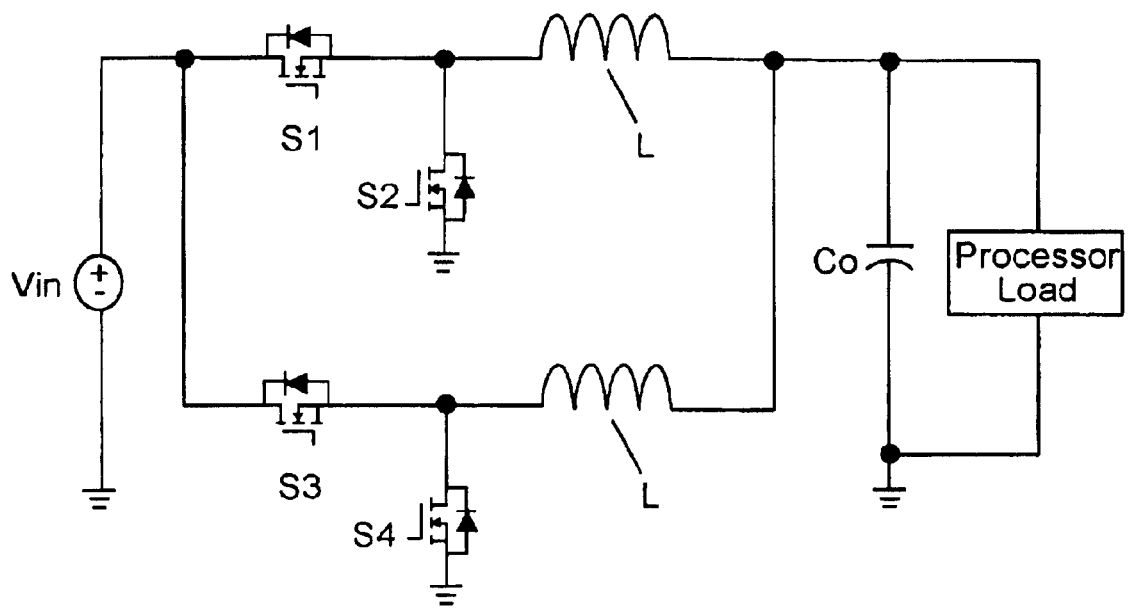
FIG. 1 is a schematic diagram of an exemplary two-phase buck converter.

Referring now to the drawings, and more particularly to FIG. 1, there is shown a schematic diagram of an exemplary multiphase buck converter suitable for supplying power to a semiconductor integrated circuit load such as a microprocessor. It should be understood that while FIG. 1 does not include the invention, it is, nevertheless, provided and arranged to facilitate an understanding of the invention and no portion thereof is admitted to be prior art as to the present invention. A two-phase buck converter is illustrated for simplicity but more phases can be provided if desired.

It will be appreciated by those skilled in the art that capacitor $C_O$ is a filter capacitor capable of supplying current, including transient current levels to the load while maintaining voltage substantially constant. The value of the capacitance will thus depend on the magnitude of the ripple voltage, current requirements of the load and the voltage tolerance of the load and it is usually desirable to minimize the capacitance value consistent with these requirements.

In series with voltage or power input source $V_{IN}$ and capacitor $C_O$ a plurality of preferably identical branches or phases are provided. Each branch or phase includes an input switch S1, S3, preferably comprising a parallel connected transistor and diode, which are periodically activated, preferably in an interleaved fashion (which the term "phase" reflects). The duty cycle of each phase is controlled by a feedback arrangement to regulate the output voltage to a desired level.

Each phase also includes a series inductance, L, which, as is well-understood in the art, will cause a voltage to be developed across it which opposes or "bucks" any change in current. Hence, the converter is referred to as a "buck" converter. The voltage across the inductor is clamped by switches S2, S4 (also preferably comprising a parallel connected transistor and diode) to limit the current in the inductor and the bucking voltage developed. Accordingly, both the inductor and the clamp of each phase tend to cancel the ripple voltage and smooth the current flow to the filter capacitor and the multiple phases tends to further distribute the current flow to the filter capacitor over time to further cancel a portion of the ripple voltage/current, as alluded to above. The ripple voltage will be completely cancelled when the duty cycle equals the inverse of the number of phases and multiples thereof (to a maximum of one).

Figure 2:
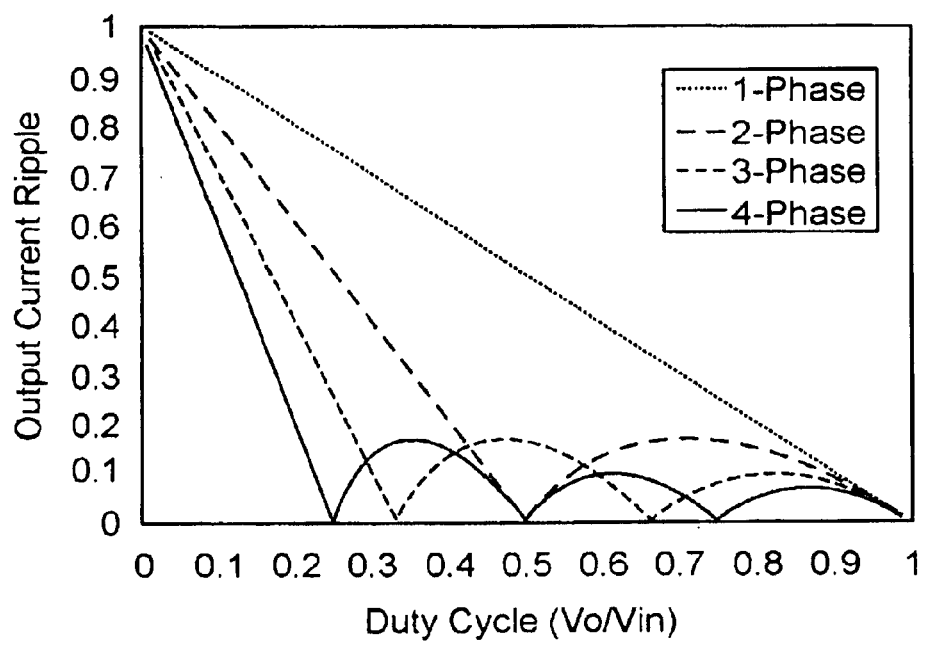
FIG. 2 is a graphical plot of normalized output current ripple versus duty cycle for multiphase buck converters of different numbers of phases.

However, some ripple voltage/current is unavoidable when there is a differential between input and output voltages and is inherent in any voltage converter or power supply since the power transferred in the ripple voltage/current must equal the power output by the converter. Thus, the power output from the converter must be matched by the ripple voltage/current and the time or duty cycle over which the (switched input) ripple voltage exceeds the output voltage. The voltage/current ripple is also a function of the difference in input and output voltages of the converter. Therefore, as alluded to above, an increased voltage differential from input to output implies a shorter duty cycle (which, for a buck converter is or may be taken as $V_{IN}/V_O$) but an increased ripple voltage/current. Therefore, with very short duty cycles the current ripple reduction is poor, as illustrated in FIG. 2 in which ripple voltage increases linearly with decrease of duty cycle at short duty cycles where there is a time gap between active periods of switching of phases and ripple cancellation effects do not occur.

Figure 3:
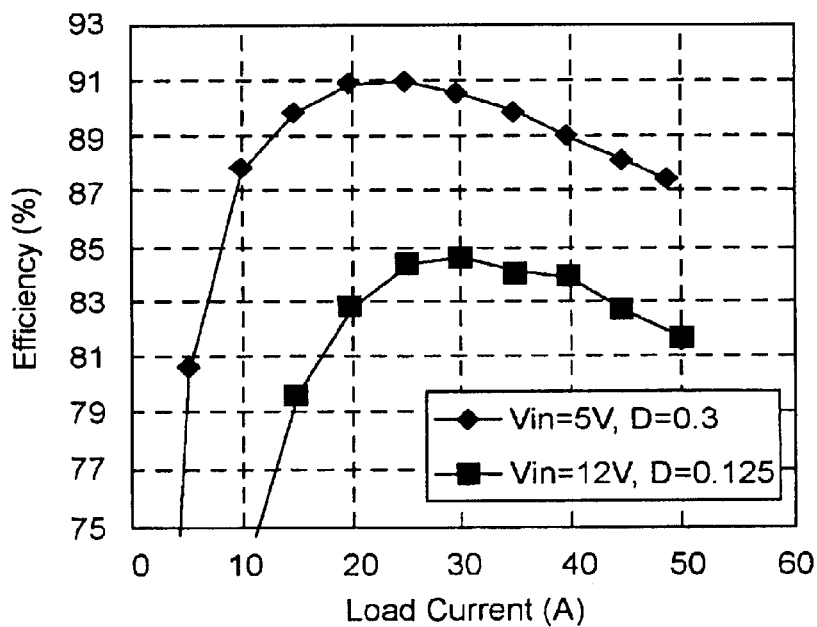
FIG. 3 is a graphical of efficiency as a function of load for the two-phase buck converter of FIG. 1 at two different duty cycles corresponding to different input voltages.

It can also be appreciated that, at short duty cycles, transient response will be compromised (since short duration increased loads will coincide relatively less with periods when current is being supplied) and efficiency and voltage stability will be reduced (due to increased capacitor currents) as shown in FIG. 3 and described above. Thus, increased voltage differential from input to output directly corresponds to a reduction in efficiency of the converter while, as a practical matter, it has been necessary, as an incident of hardware economy in personal computers and the like to increase input voltages while increased clock speeds and integration density has required reduced output voltage to accommodate/reduce heat dissipation requirements. It follows that multiphase buck converters are much less well-suited to microprocessor loads and their electrical environments at the present time than a very few years ago and there is every appearance that the level of unsuitability will increase substantially in the near and foreseeable future.

In order to improve the efficiency without comprising the transient responses, alternative topologies with extended duty cycles are necessary. The tapped-inductor buck converter is one of the simplest topologies with an extended duty cycle. The principal advantage of the tapped-inductor buck converter over other topologies is the fact that it represents only a slight modification of the well-understood buck converter topology discussed above.

Figure 4:
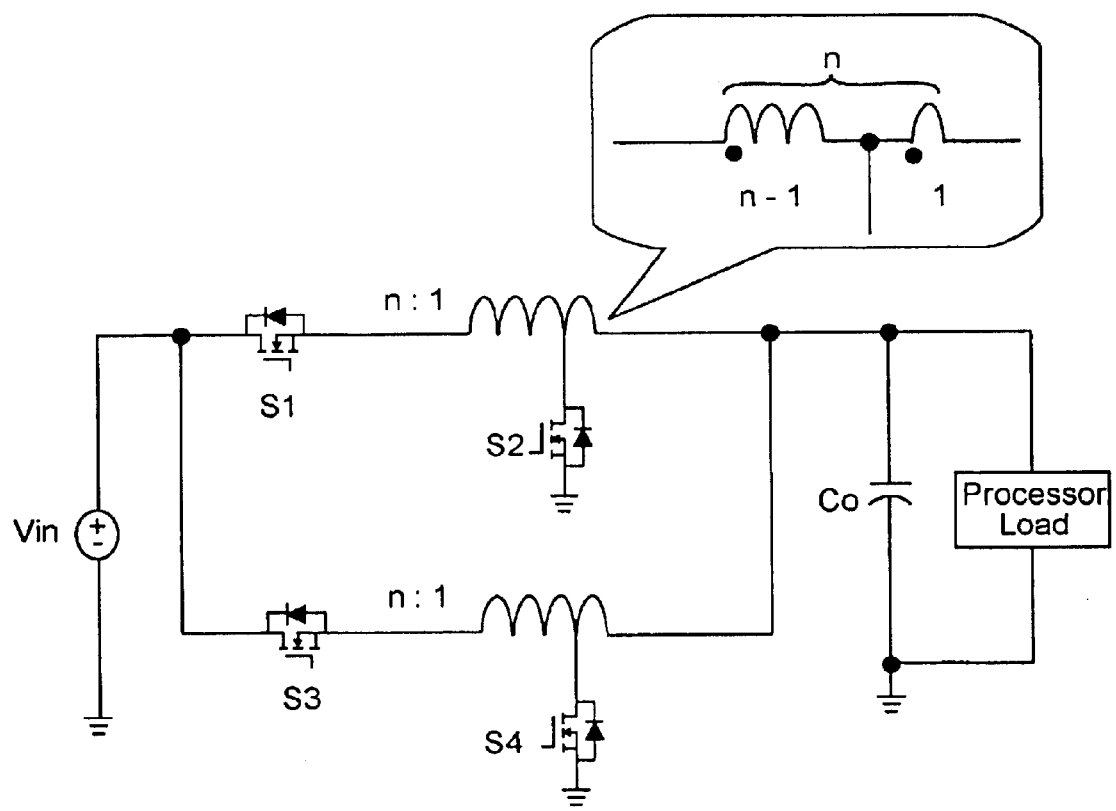
FIG. 4 is a schematic diagram of a multiphase tapped-inductor buck converter in accordance with one aspect of the invention.

FIG. 4 shows a multiphase tapped-inductor buck converter (two-phase as an example). The turns ratio of the tapped inductor is defined as the turns number of the winding in series with the top switch (e.g. S1, S3) over that of the winding in series with the bottom switch (e.g. S2, S4), as particularly shown in the inset in FIG. 4. In a multiphase tapped-inductor buck converter, the DC voltage gain is a function of both the duty cycle, D, and the turns ratio of the tapped inductor, n, and can be derived as follows:

$$V_O/V_{IN}=D/(D+n(1-D)).$$

Figure 5:
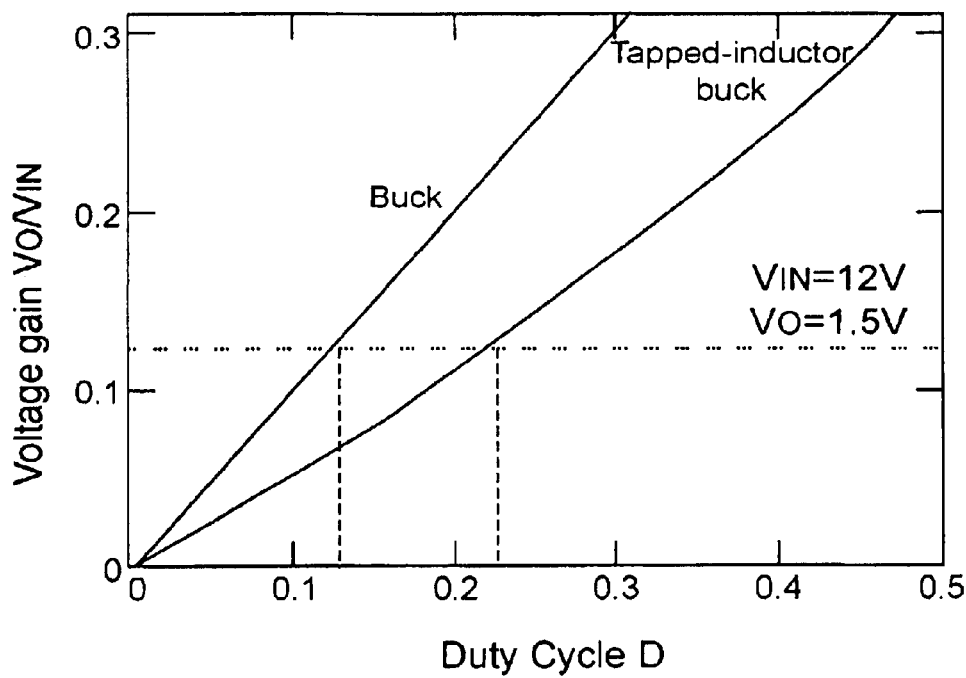
FIG. 5 is a graphical plot of voltage gain as a function of duty cycle for the circuit of FIG. 4.

FIG. 5 shows the DC voltage gain ($V_O/V_{IN}$, the inverse of the duty cycle, D, in the buck converter described above) of a multiphase tapped-inductor buck converter with n=2. The DC voltage gain of multiphase buck converter is also included for comparison. Thus it is seen that the duty cycle can be extended for any given voltage gain by use of a tapped inductor buck converter whereas the duty cycle was fixed by the ratio of input and output voltages in the buck converter of FIG. 1.

However, although the use of the tapped inductor can extend the duty cycle, leakage inductance exists between the two parts of the tapped winding. The leakage inductance causes a severe voltage spike across switching devices, especially for the top switches. The energy trapped in the leakage inductance is also dissipated in each switching cycle and generates great power losses.

Figure 6:
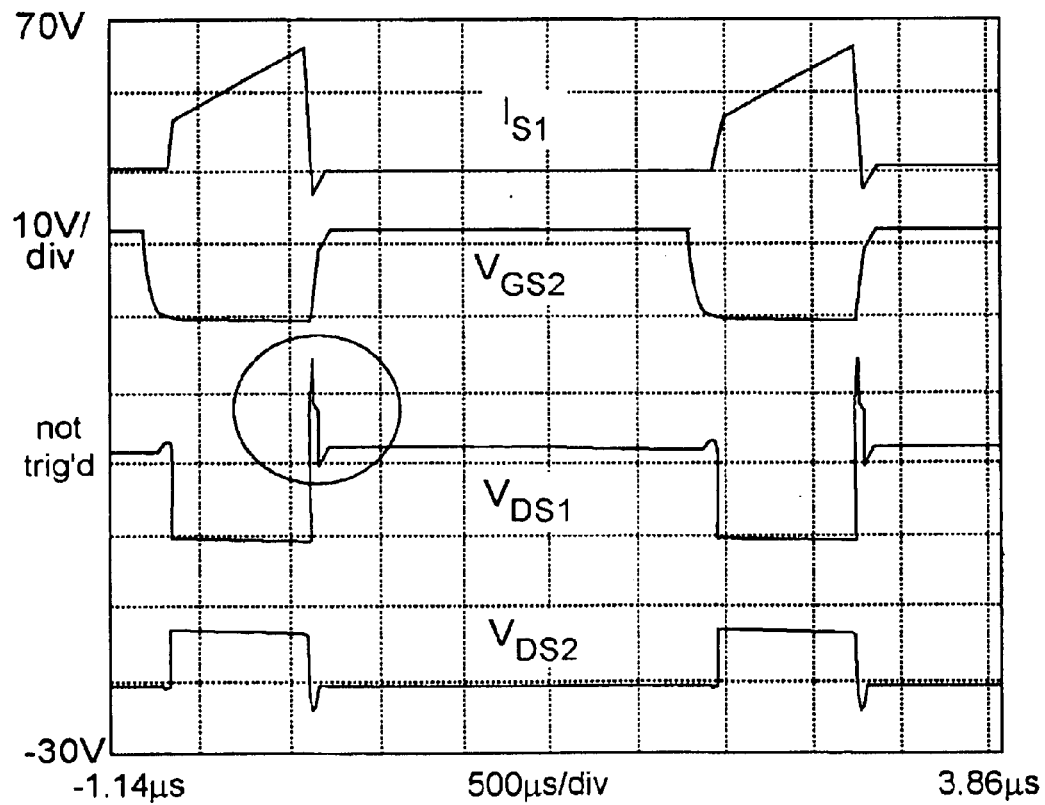
FIG. 6 depicts current and voltage waveforms in the circuit of FIG. 4.

FIG. 6 shows the measured switching waveforms in a four-phase tapped-inductor buck VRM. A huge voltage spike is observed across the top switch; the spike voltage is higher than 30 V and causes the failure of the top switch, which uses the best-available and expensive 30 V MOSFET.

Clamping or snubber circuits can be used to solve the voltage spike problem. However, these require many additional components for each channel contrary to the preferred circumstances of the intended principal application of the VRM (e.g. small size and cost and located in electrical proximity to the load). For multiphase topologies, this solution would impose great increases in both the cost and complexity of the circuit.

However, a topology referred to hereinafter as a multiphase coupled-buck converter in accordance with the invention can solve the voltage spike problem by using multi-winding coupled inductors to form an active clamping circuit between interleaving channels. This topology enables the use of a large duty cycle with recovered leakage energy and clamped device voltages. Both analyses and experiments prove that multiphase coupled-buck converter has an efficiency that is significantly better than multiphase buck converters.

Figure 7:
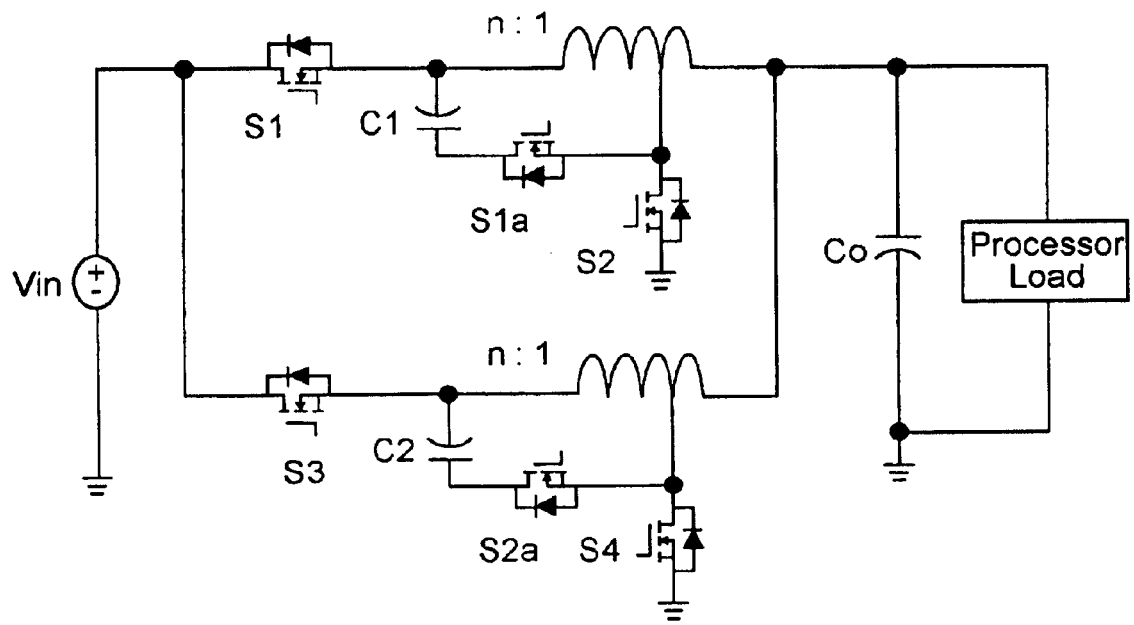
FIG. 7 is a variant form of the circuit of FIG. 4 with added active clamping.

The concept for multiphase coupled-buck converter can be understood as a multiphase tapped-inductor buck converter with an active clamping circuit for each channel in order to solve the voltage spike problem, as shown in FIG. 7. Each channel has an active clamping circuit formed by a capacitor and a MOSFET. The capacitor has a constant voltage, which serves as a voltage source in steady-state operation. The MOSFETs S1$a$ and S2$a$ have the same control timings as bottom switches S2 and S4, respectively. After top switch S1 or S3 turns off, the current trapped in the leakage inductance forces the body diode of S1$a$ or S2$a$ to conduct. Consequently, the drain-source voltage of top switch S1 or S3 is clamped to the input voltage plus the clamping capacitor voltage, and the leakage energy is stored in the clamping capacitors C1 or C2 and is recovered to the load later.

Figure 8:
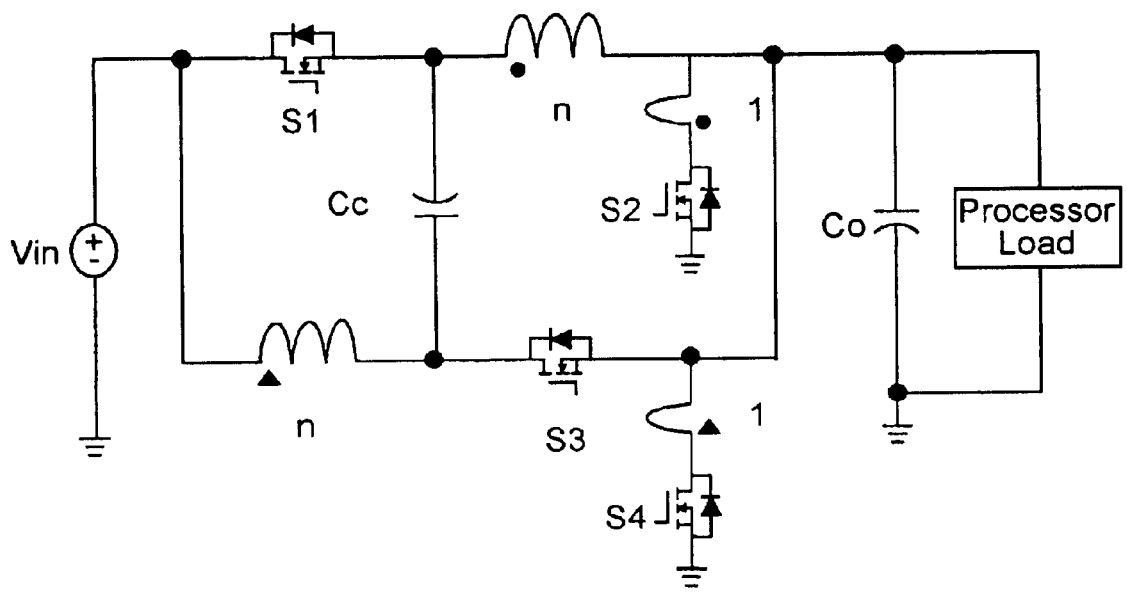
FIG. 8 illustrates a variation of the circuit of FIG. 7 with active clamping between neighbor channels.
Figure 10:
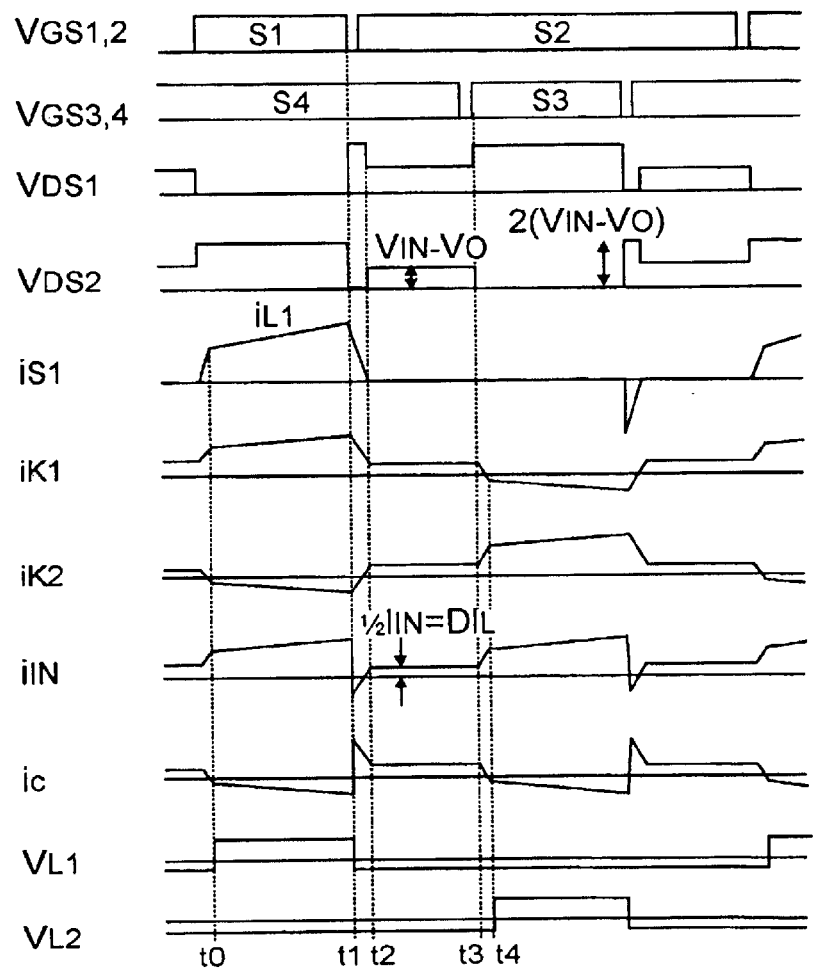
FIG. 10 is a graphical plot of voltage and current waveforms in the circuit of FIG. 9.

Since multiphase topologies already have many switches, it is considered desirable to rearrange neighbor channels so that the existing switches can incorporate the function of the additional switches S1$a$ and S2$a$. FIG. 8 shows a resulting configuration which is very simple (and of fewer circuit elements) since the order of the top switch and the inductor is irrelevant in a series connection. In this configuration or topology, top switches S1 and S2 have two functions: they serve as the control switches for their own channels and meanwhile, also serve as the active clamping switches for neighbor channels. In order to realize this active clamping concept, the capacitor Cc has to appear as a constant voltage, as shown in FIG. 10. However, further investigation reveals that this capacitor does not have a constant voltage because the switches S1 and S3 do not switch complementarily, and the two top windings in the neighbor channels have different voltages across them.

Figure 9:
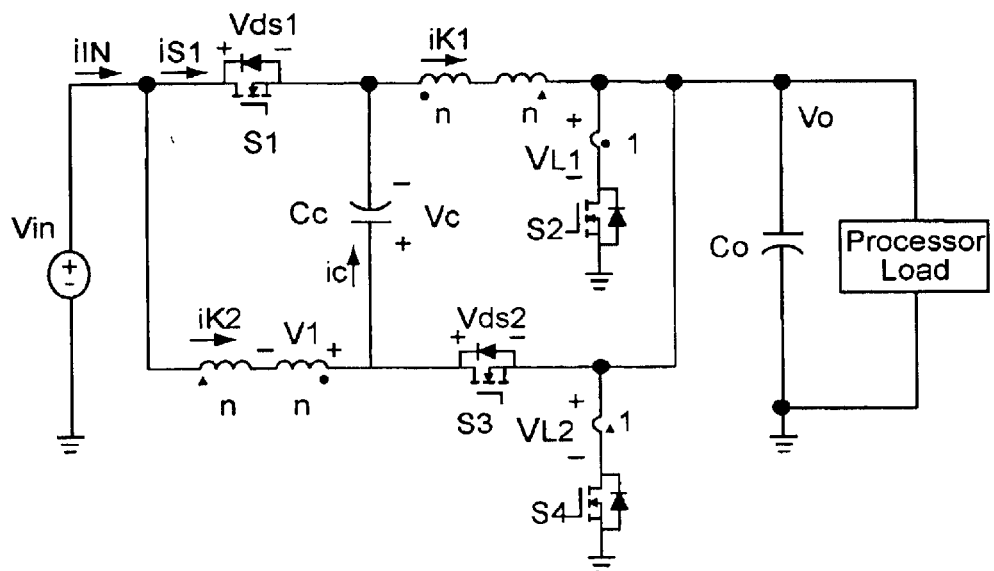
FIG. 9 illustrates a preferred form of a coupled buck converter in accordance with the invention.

A modification may be made in order to allow the clamping capacitor to have a constant voltage. The resulting topology, called multiphase coupled-buck converter hereinafter, is shown in FIG. 9. In the circuit of FIG. 9, a third winding is coupled with the output inductor of the neighbor channel (as indicated by the circular and triangular indicia applied thereto) and is placed in series with the existing top winding. The voltage induced in the third winding compensates the voltage of the existing top winding in the neighbor channel. Therefore, the clamping capacitor appears as a constant voltage, which equals the input voltage minus output voltage. FIG. 10 shows the key operation waveforms. The voltage stress waveforms Vds1 and Vds2 clearly show the voltage clamp effect due to the constant voltage across the clamp capacitor Cc. Based on the steady-state operation waveforms of VL1 or VL2, the DC voltage gain of the multiphase coupled-buck converter can be derived as follows:

$$V_O/V_{IN}=D/D+n.$$

Figure 11:
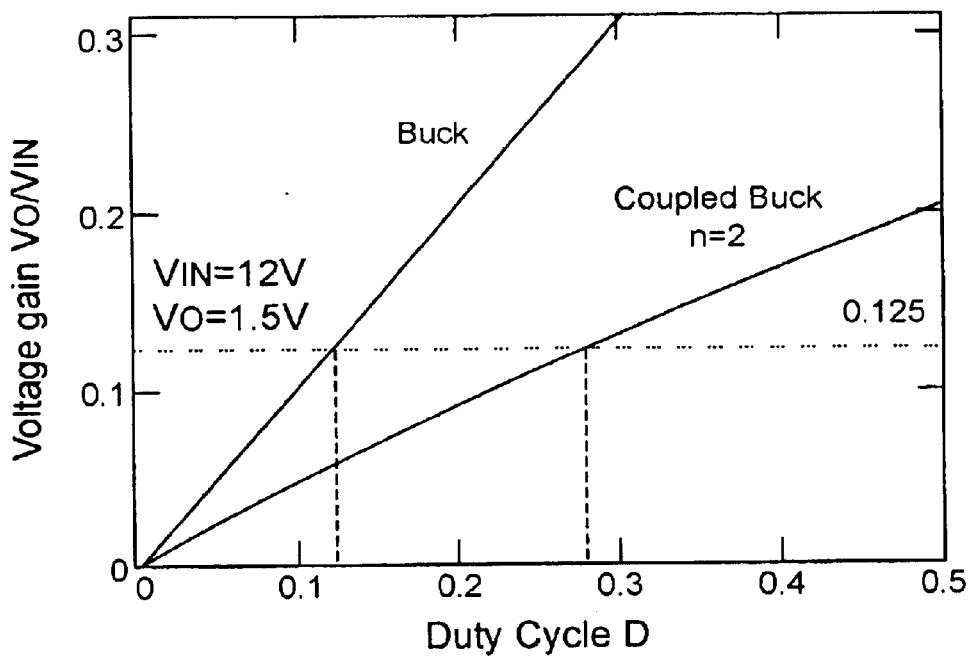
FIG. 11 is a graphical plot of DC voltage gain as a function of duty cycle of the circuit of FIG. 9.

FIG. 11 shows the DC voltage gain of multiphase coupled-buck converter as a function of the duty cycle D and the turns ratio n. The DC voltage gain of the multiphase buck converter of FIG. 1 is also included for comparison. The desirable turns ratio is determined by transient response. For a VRM stepping from 12 V to 1.5 V, the preferred turns ratio is 2:1. With the turns ratio n=2, multiphase coupled-buck converter operates at 0.286 duty cycle, while the duty cycle of multiphase buck converter is only 0.125. With extended duty cycle, multiphase coupled-buck converter can be expected to have a higher efficiency than the multiphase buck converter of FIG. 1 for similar voltage differentials. For a fair comparison, the four-phase coupled buck VRM is designed with the same MOSFETs, input capacitors and output capacitors, and operates at the same conditions as the four-phase buck VRM. The switching frequency, the input voltage, the output voltage and the output current are 300 KHz, 12 V, 1.5 V and 50 A, respectively. In order to make the efficiency comparison meaningful, the design of inductors is based on the same transients.

Figure 12:
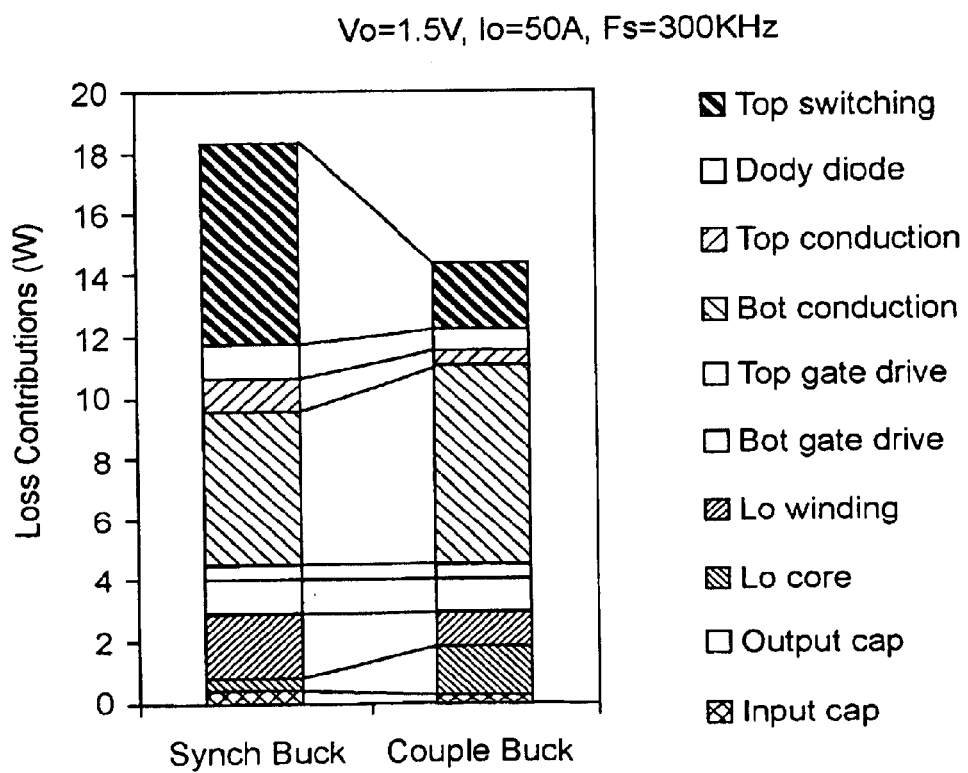
FIG. 12 is a graphical comparison of loss contributions of a four phase buck converter and a four phase coupled buck converter in accordance with the invention.

FIG. 12 shows the loss contributions at full load for the four-phase coupled buck VRM and the four-phase buck VRM. The main loss differences are the switching loss of the top switches and the conduction loss of the bottom switches. The losses from the other components are almost the same. The four-phase coupled buck VRM has 1 W more conduction loss from the bottom switches than the four-phase buck VRM, but 5 W lower switching loss from its top switches. Compared to the four-phase buck VRM. The overall loss reduction for the four-phase coupled buck VRM is 4 W, which corresponds to 4% efficiency improvement at full load.

Figure 13:
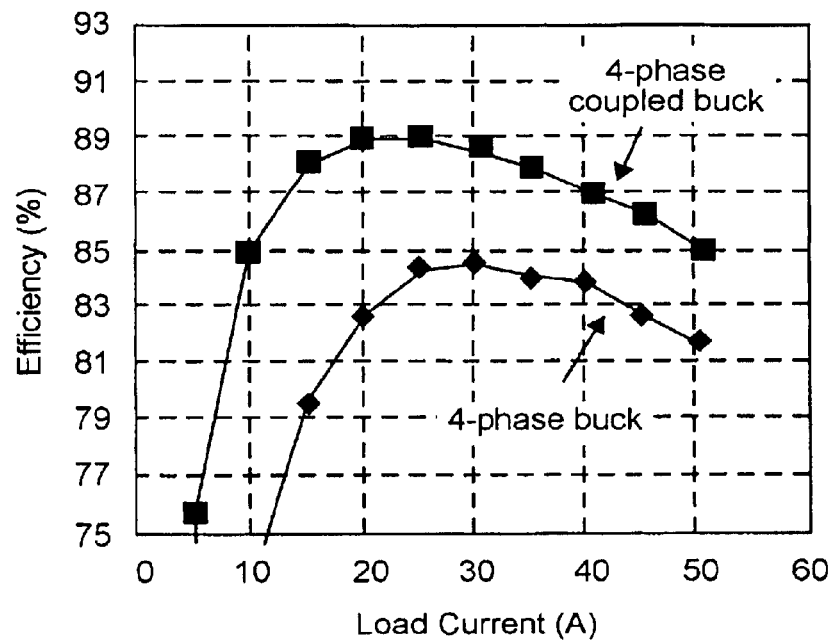
FIG. 13 is a graphical plot of efficiency as a function of load of the converters compared in FIG. 12.

FIG. 13 shows the measured efficiency of the four-phase coupled-buck VRM and the four-phase buck VRM. For the four phase coupled buck VRM, the full-load efficiency is more than 85%, and the maximum efficiency is 89%. Compared to the four-phase buck VRM, the four-phase coupled buck VRM has an efficiency improvement of about 3.5% at full load and 4.5% at the highest point of efficiency.

Multiphase converters require many magnetic components which may increase the cost and size of the VRM. Integrated magnetics can reduce the number of the magnetic components as well as reducing the core loss by flux ripple canceling effect. By coupling inductors between channels, integrated magnetics can further reduce the steady state current ripple while maintaining the same transient response to further improve the efficiency. Further, size and component count of a VRM and, possibly, its cost can be reduced if the required magnetic circuits can be integrated. Certainly, while integrated magnetics for a VRM may be an application specific component, the probable volume needed to provide power to microprocessors would establish a substantial manufacturing volume for substantial economy.

Figure 14:
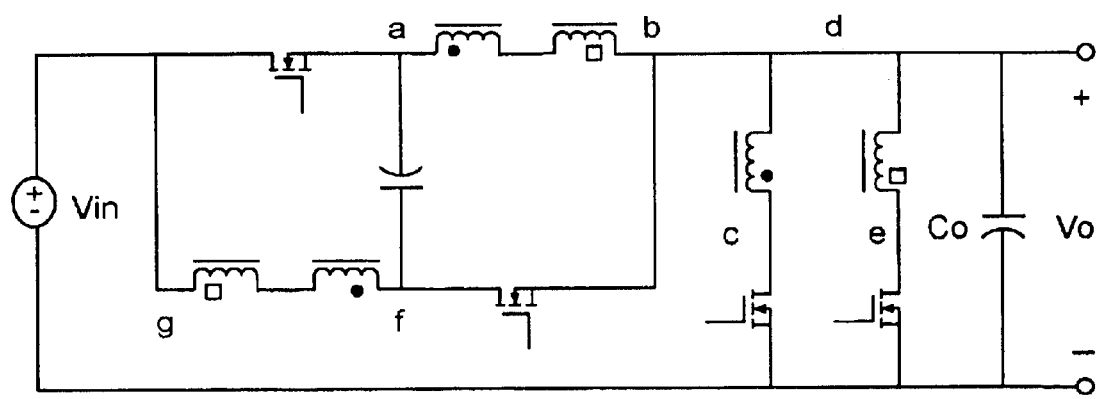
FIG. 14 is a schematic diagram of a multiphase coupled buck converter with labelled windings.
Figure 15A:
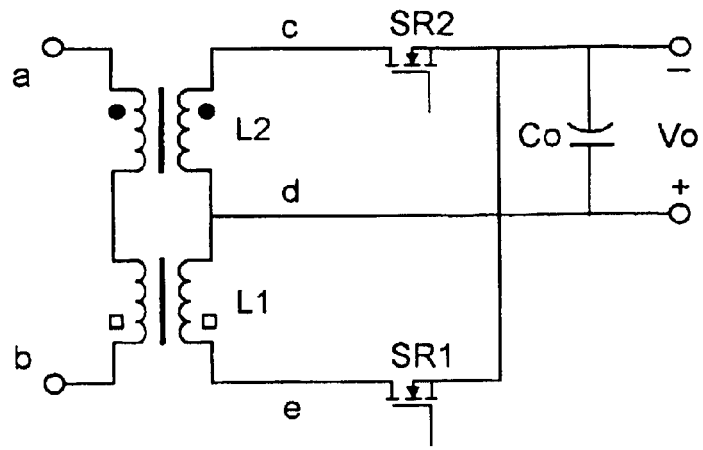
FIG. 15A illustrates magnetic coupling in the circuit of FIG. 14 and FIGS. 15B and 15C illustrate discrete magnetic implementations thereof, FIGS. 16A, B, C, and D illustrate an approach in accordance with the invention of deriving an improved integrated magnetic structure in accordance with the invention.

FIG. 14 shows the multiphase coupled-buck converter similar to FIG. 9 with labeled windings. A high number of magnetic components used are used in this topology. Each channel has a three-winding coupled inductor. In the multiphase coupled-buck converter, the configuration of the magnetic components and associated output stage can be extracted and redrawn as shown in FIG. 15A. In order to simplify the drawing, FIG. 15A only shows one high-turns winding. The same discussion can be applied to two or more high-turns windings.

Figure 15B:
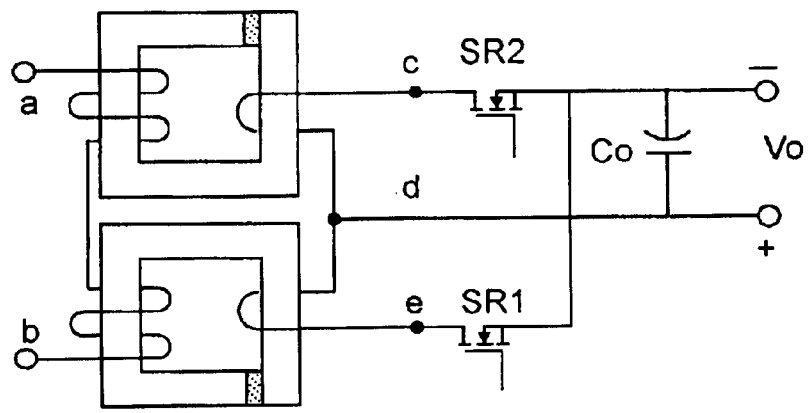

FIG. 15B shows the discrete magnetic implementation for the circuit of FIG. 15A. Two coupled inductors are built on two pairs of separate U-I cores (so-called from their letter-like shape). The air gaps are placed on one leg of the U-I cores, as shown in FIG. 15B to obtain the desired inductance value when the inductor is fabricated with a core of ferrite or the like to control coupling.

Figure 15C:
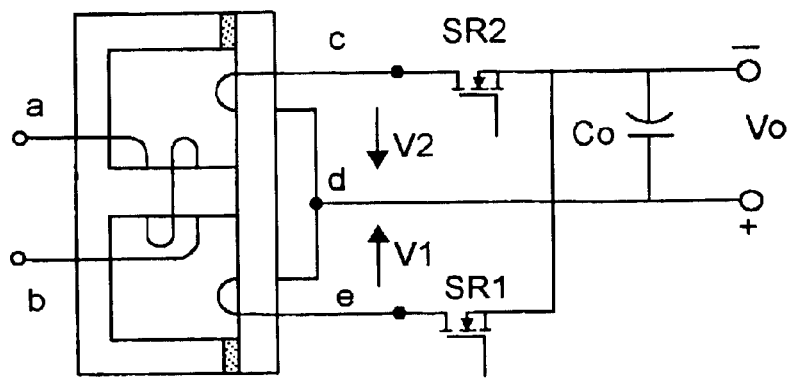

As a matter of integration of the magnetic structure of FIG. 15B, the two pairs of U-I cores can be moved together and combined into a pair of E-I cores, as shown in FIG. 15C. There is no air gap in the center leg of the E-I cores. The center leg is a low-reluctance path. The fluxes generated by the two windings in the two outer legs all flow through the center leg. There is no interaction between the two flux loops. Although the two inductors are built on the same pair of E-I cores, there is no coupling effect between them. The core structure is simplified. The winding structure can also be simplified. As shown in FIG. 15C, the two high-turns windings can be moved from the two outer legs to the center leg due to the flux continuity. The resulting structure actually is the same as integrated magnetics structure proposed by W. Chen in U.S. Pat. No. 5,784,266, which is hereby fully incorporated by reference. Both core and winding integration are realized in this structure. For high-current applications, this winding integration becomes more important because of its lower interconnection loss and lower conduction loss.

Despite all the advantages described above for FIG. 15C, this integrated magnetic structure has some drawbacks. As shown in FIG. 15C, the air gaps are placed on the two outer legs and there is no air gap in the center leg in order to avoid the interaction between the two flux loops. However, this kind of magnetic core is not a standard industry practice; precise gapping adjustment is required for matching of the twp inductance values and filling is required for mechanical stability, which means mass production is difficult and costly. Besides the cost, the two pieces of the core are connected only at the center leg, rendering the structure mechanically unstable. Moreover, the existence of air gaps on the two outer legs also causes an electromagnetic interference (EMI) issue.

Another drawback is that the transformer in the existing integrated magnetics has a large leakage inductance. As shown in FIG. 15C, the primary windings of the transformer are wound around the center leg while the transformer's secondary windings are wound on the two outer legs. A significant leakage flux exists in the transformer windings, and the coupling between the transformer's primary and secondary windings is poor. Consequently, the transformer in the integrated magnetics of FIG. 15C has a large leakage inductance, causing severe parasitic ringing across semiconductor devices, decreasing the effective duty cycle at the secondary, and impairing efficiency.

In order to overcome the limitations of the existing structure, a novel integrated magnetics is provided in accordance with the invention. In this novel structure, the core structure requires an air gap in the center leg and no air gap in the two outer legs, which is easier to manufacture since the structure is stable and no gap filling is required in accordance with industry standard practice. Also, only one air gap need be accurately formed. All the windings are wound on the two outer legs so that the leakage inductance can be minimized. The flux ripples are canceled in the center leg. With the small flux ripples in the center leg, both the core loss and the winding loss can also be reduced. The air gap in the center leg introduces inverse coupling between the two output inductors. Thus, both the steady state and dynamic performance of the converter can be improved.

Figure 16A:
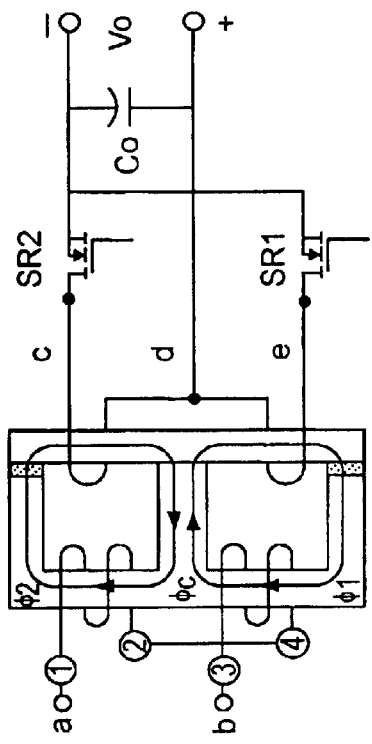
Figure 16B:
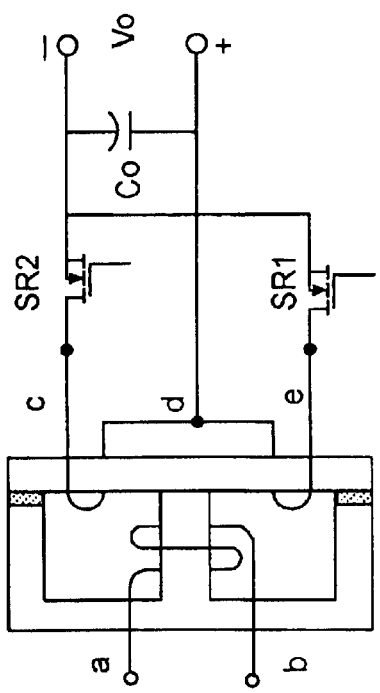

FIGS. 16A through 16D show the approach for deriving the improved integrated magnetic structure by which it can be better understood. Beginning with the integrated magnetics structure shown in FIG. 15C, the transformer's primary winding is split between two outer legs, as shown in FIG. 16B, without changing the flux distributions. Since both the primary and secondary windings are wound on the two outer legs, interleaving can be used to minimize the leakage inductance of the integrated transformer.

Figure 16C:
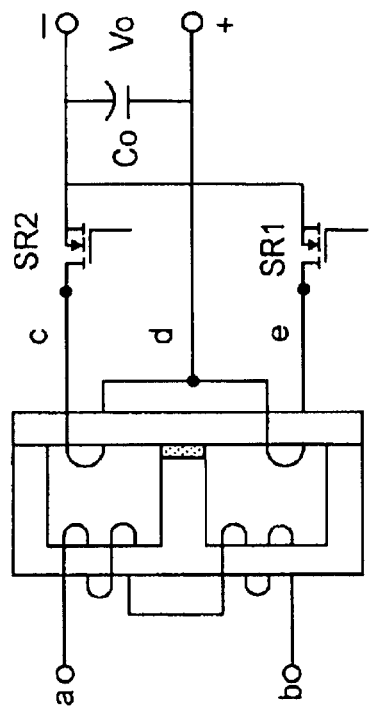

The polarity of one set of windings is changed through different winding connections, as shown in FIG. 16C. Correspondingly, the direction of flux is changed as well. Before the change, the DC flux circulates between the two outer legs and no DC flux exists in the center leg. The air gaps on the outer legs prevent saturation of the core. After the polarity change, no DC flux circulates between the two outer legs. As further shown in FIG. 16C, since there is no DC flux circulating between the two outer legs, the air gaps in the outer legs can be shifted to the center leg while keeping the core unsaturated, as shown in FIG. 16D.

Figure 16D:
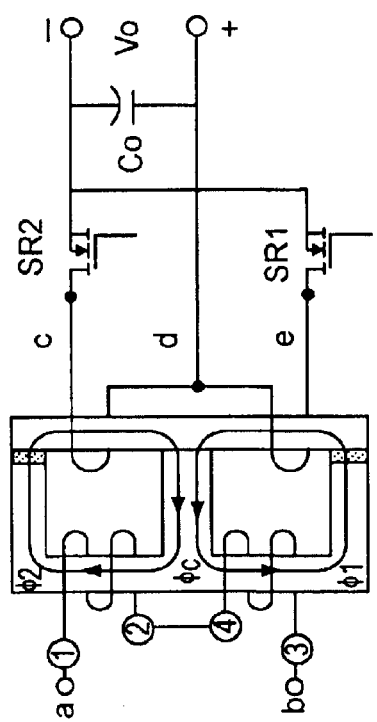

Thus, FIG. 16D shows the preferred integrated magnetic structure, in which the primary and secondary windings of the transformer are wound on the two outer legs. Thus, the integrated transformer offers minimized leakage inductance. Moreover, the core structure has an air gap in the center leg and no air gap in the outer legs; more consistent with standard industry practice and much easier to manufacture.

Figure 17A:
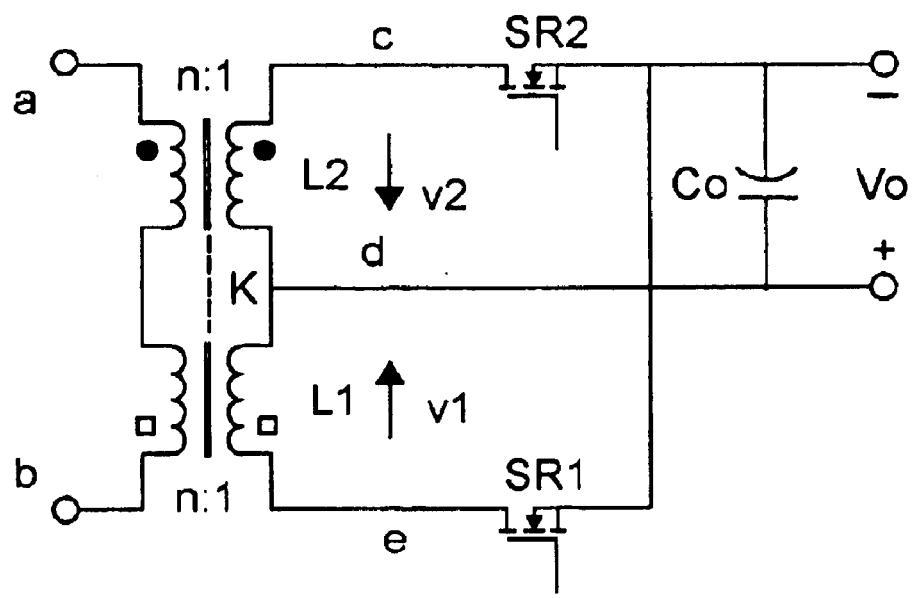
FIGS. 17A and 17B are equivalent circuits of FIG. 16 in the form of coupled inductors and in the form of transformer and inductors, respectively, FIGS. 18A and 18B compare flux distribution in existing core structures and core structures integrated in accordance with the invention, FIGS. 19A and B are graphical plot of magnetic flux waveforms in the cores of FIGS. 18A and 18B, FIGS. 20A and 20B illustrate a comparison of inductor current and voltage waveforms in coupled and non-coupled buck converters, respectively.
Figure 17B:
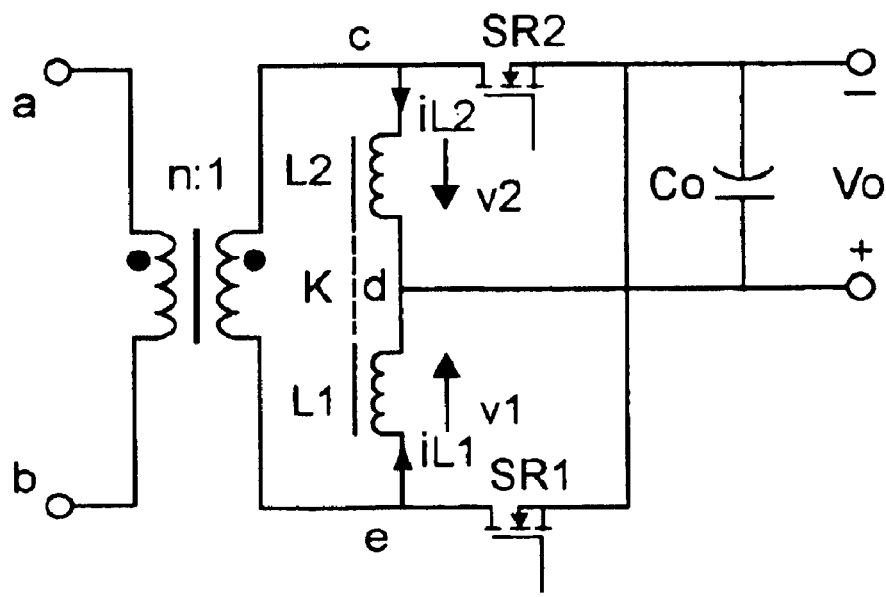

FIGS. 17A and 17B show the equivalent electrical circuits of the proposed integrated magnetic circuit. The equivalent circuit can be represented as either coupled inductors as shown in FIG. 17A or as a transformer and inductors as shown in FIG. 17B. These two equivalent circuits are equivalent to each other and interchangeable. The circuit of FIG. 17B is referred to hereinafter a a current-doubler rectifier with the two output inductors reverse-coupled.

In the preferred integrated magnetics in accordance with the invention, only the center leg has an air gap, and there no air gaps in either of the two outer legs. The reluctance in the center leg is thus much larger than those of the outer legs. Without considering the reluctance of the magnetic material, the coupling coefficient for the two inductors in the proposed structure is close to one. However, the concept of unity coupling is very different from conventional ideas: "close to one" does not mean "equal to one". The increase in the coupling coefficient is achieved by the increase in both the self-inductance and mutual inductances. However, the two coupled inductors still have a certain amount of leakage inductance.

Figure 18A:
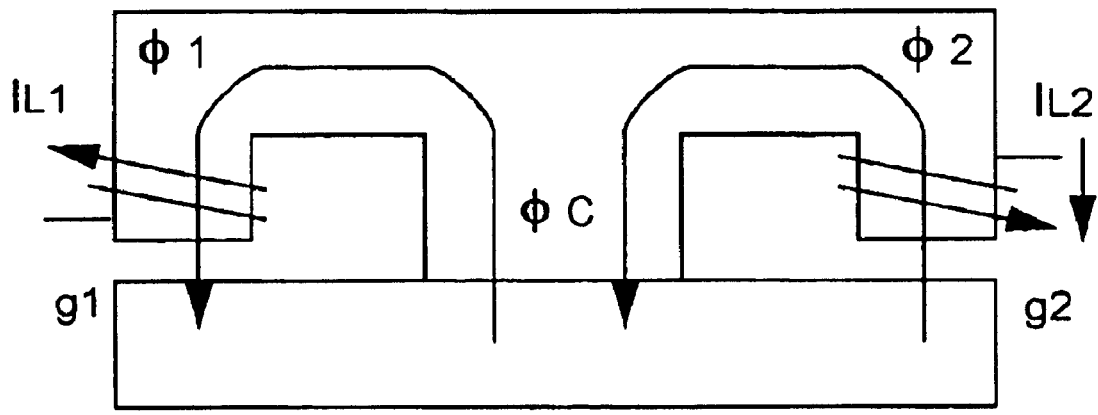
Figure 18B:
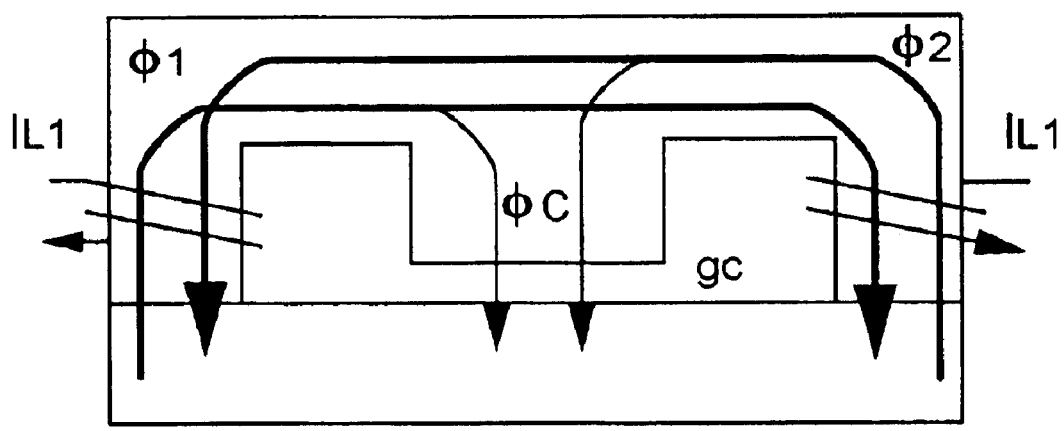

FIGS. 18A and 18B show the flux distributions in the cores of FIGS. 15C and 16D, respectively. According to Farad's Law, the AC fluxes in the two outer legs are the time integral of the voltage (which is more simply stated as volt-seconds) across the corresponding winding. For both the existing and the proposed integrated magnetics, the winding voltage waveforms are the same because they are determined by the conduction states of the external switches.

The AC flux in the center leg is the sum of the AC fluxes in the two outer legs. In the integrated magnetics of FIG. 15C, as shown in FIG. 18A, the AC fluxes are added in the center leg according to the phase relationship of the winding voltages. However, in the novel integrated magnetics structure of FIG. 16D, the polarity of one set of windings is changed; therefore, the direction of AC flux in one of the two outer legs is also changed. Consequently, the AC fluxes are canceled in the center leg.

In the integrated magnetics structure of FIG. 15C, the DC flux in the center leg is zero. For the integrated magnetic structure of FIG. 16D, the self-inductance L is larger than that of FIG. 15C. The majority of the DC flux generated by one set of windings goes through the other set of windings. Because of the inverse direction, the majority of DC flux in the two outer legs is cancelled. The percentage of the DC flux that is cancelled is proportional to the mutual inductance M. Although a larger self-inductance in the proposed structure generates larger DC flux, the percentage of the cancelled DC flux is also increased. The overall effect is that the net DC fluxes in the outer legs of the structure of FIG. 16D are the same as those in the structure of FIG. 15C. The net DC fluxes in the outer legs go through the center leg.

With the same value for L−M (M=O in the structure of FIG. 15C), the existing and proposed integrated magnetic structures have equal DC flux biases in the two outer legs. Assuming that the cross-section area of the center leg is twice that of each the outer leg, the use of the same length of air gap in the existing and proposed structures achieves equal DC fluxes in the two outer legs.

Figure 19A:
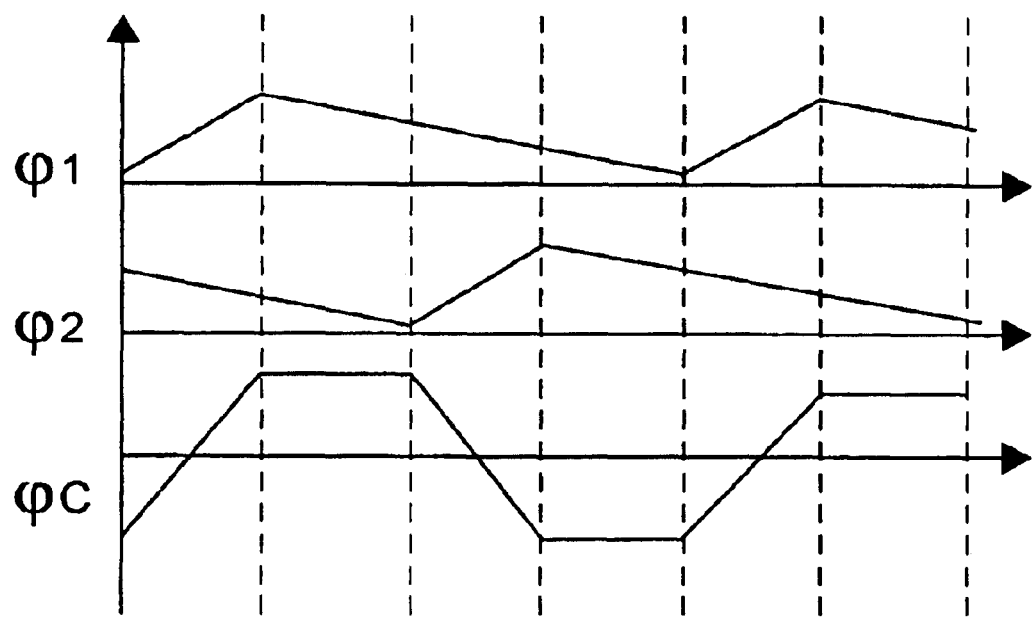
Figure 19B:
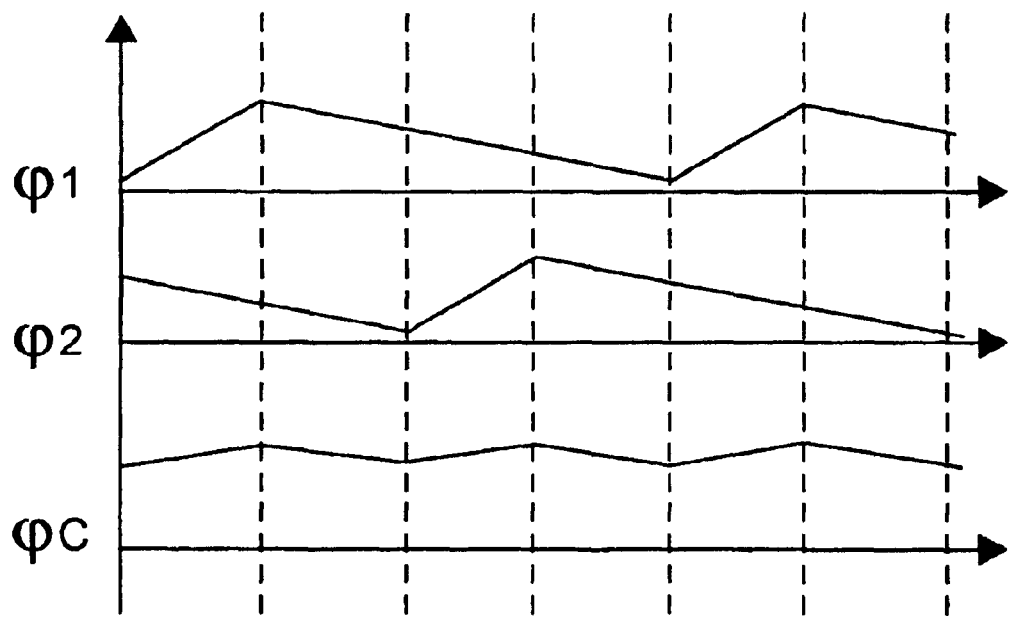

In summary, the flux waveforms in the core structures are illustrated in FIG. 19 for the integrated magnetics of FIGS. 15C and 16D, respectively. If the same cores and windings are used, the existing and proposed integrated magnetic structures have the same AC fluxes in the two outer legs. If the two core structures are designed to have the same inductance value L−M, the DC fluxes in the two outer legs are the same, too. In the center leg of the structure of FIG. 15C, the AC fluxes are added, and the DC fluxes are canceled to zero; for the structure of FIG. 16D, the AC fluxes are canceled, and the DC fluxes are added. With the reduction of the magnitude of AC flux in the center leg, the integrated magnetics of FIG. 16D has a lower core loss in the center leg than do integrated magnetics such as FIG. 15C.

Another advantage of the AC flux cancellation in the center leg is the much smaller fringing effects and fewer EMI problems caused by the air gap. Large air gaps usually associated with fringing effects and EMI problems. However, the AC flux through the air gap in the center leg is much smaller and the fringing effects associated with the center leg air gap are, accordingly, much smaller. Further, the less eddy currents generated in the windings, the lower winding loss.

The air gap in the center leg introduces a coupling between two output inductors in the integrated magnetic circuit of FIG. 16D. The effect of coupled inductors can be illustrated by the use of the equivalent electrical circuit shown in FIG. 17, discussed above. As shown in FIG. 17, the two inductors are inversely coupled. With coupled inductors, the steady-state inductor ripple current can be reduced while keeping the same transient response.

Figure 20A:
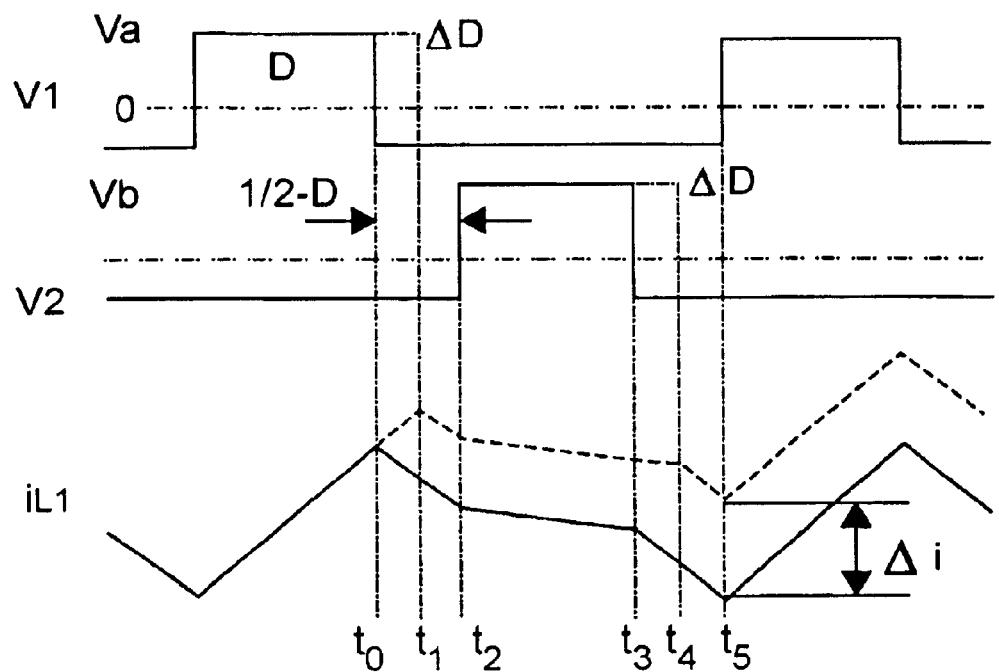
Figure 20B:
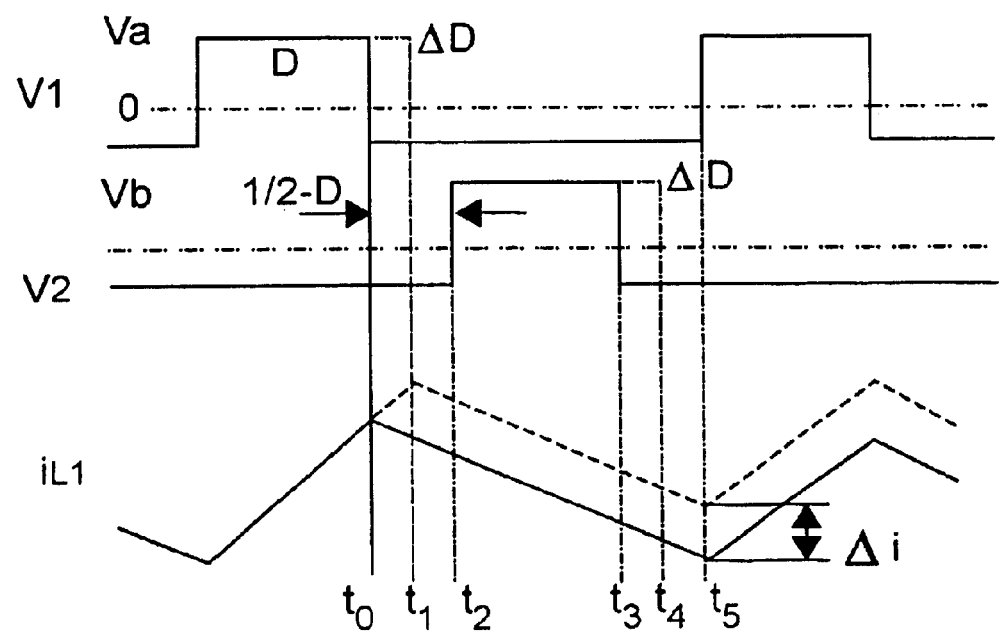

FIGS. 20A and 20B show the inductor voltage and current waveforms during a transient for the non-coupling and coupling cases. The steady-state inductor current waveform is depicted by a solid line while the transient inductor current waveform is depicted by a dotted line. Assuming the duty cycle has an increase of ΔD during the transient, the inductor current has an increase of Δi after a switching cycle. Study shows that with the same value for L−M (M=0 in the structure of FIG. 15C), the two magnetic circuits have the same transient inductor slew rates.

Figure 21:
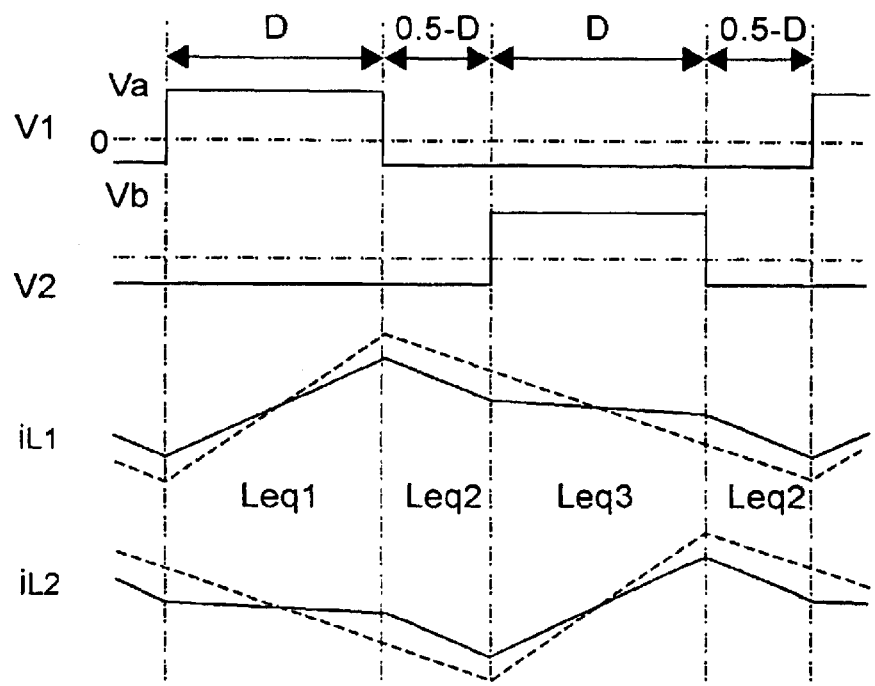
FIG. 21 is a stedy-state waveforms for coupled and non-coupled buck converters, respectively.

FIG. 21 shows the steady-state inductor voltage and current waveforms for the non-coupling and coupling cases. Again, the solid lines correspond to the coupling case, while the dashed lines correspond to the non-coupling case. A large inductance is preferred so that the current ripples can be reduced. Study shows that with the same transient equivalent inductance (L−M), the steady-state current ripple of the coupling case is always smaller than that of the non-coupling case.

In summary, with the same transient equivalent inductance (L−M), the steady-state current ripple of the coupling case is always smaller than that of the non-coupling case. Thus, the efficiency of the converter can be even further improved. This is another benefit to use the integrated magnetic structure of FIG. 16D Which provides a substantial increase in performance in terms of ripple, voltage stability and transient response with a reduced component count relative to other solutions to problems of buck converters and tapped inductor buck converters while being capable of being fabricated at small size for high current density.

The structure of FIG. 16D can be advantageously refined further, as will now be discussed. Because of coupled output inductors, the output current of the multiphase coupled-buck converter is pulsing and the RMS current flowing into the output capacitors increases. Consequently, the output ripple voltage increases. The pulsing output current also generates switching noise across the equivalent series inductance (ESL) of the output capacitors (since pulsing current has a high di/dt).

Figure 22:
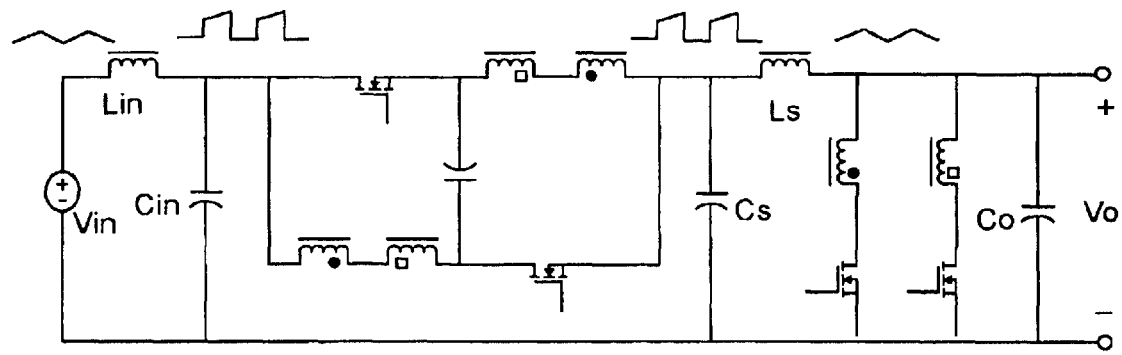
FIG. 22 is a schematic diagram of a variation of the circuit of FIG. 14 with built-in filtering.

In order to smooth the pulsing input and output currents, additional L-C filters are required such as are shown in FIG. 22. However, additional inductors and capacitors increase component count as well as size and cost of the VRM.

Figure 23:
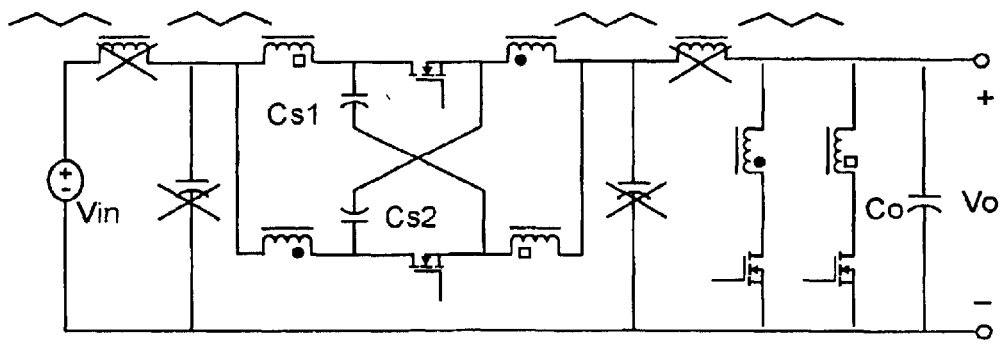
FIG. 23 is an improved variant form of the circuit of FIG. 22, FIGS. 24A and 24B illustrate the derivation of the circuit of FIG. 23.

Thus, in order to solve the problems associated with the pulsing output current without these disadvantages and problems engendered by adding one or more L-C filters, an improved multiphase coupled-buck converter is shown in FIG. 23. Compared to the multiphase coupled-buck converter of FIG. 16D, the improved multiphase coupled-buck converter of FIG. 23 has smooth input and output currents without additional L-C filters and suitable filters are developed within the coupled buck converter in a built-in manner. Due to the existence of built-in filters, the input filter size can be reduced in the improved multiphase coupled-buck converter, and sometimes even no external input filter is needed. Specifically, in the improved multiphase coupled-buck converter of FIG. 23, the built-in filters are formed by the leakage inductance and the clamping capacitors Cs1 and Cs2 and the input L-C ($L_{in}$ and $C_{in}$) filter and the output L-C (Ls and Cs) filter components can be omitted.

Figure 24A:
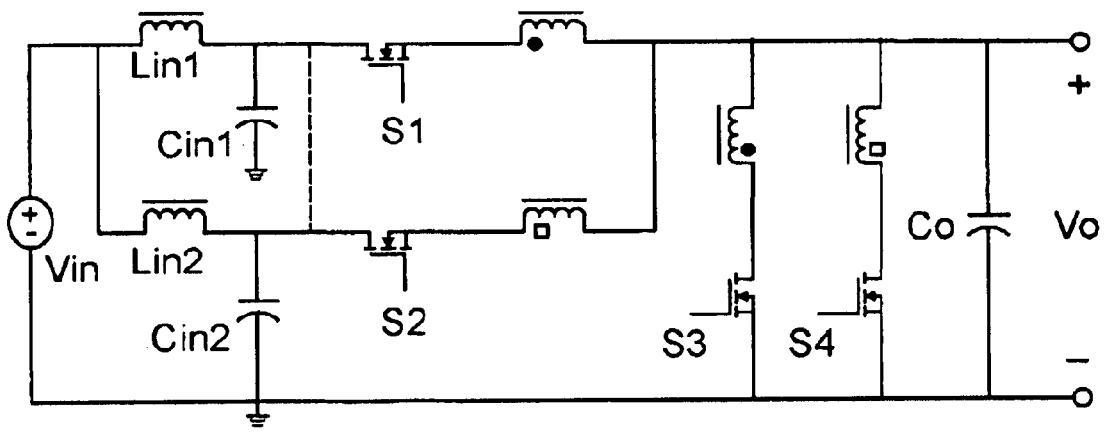
Figure 24B:
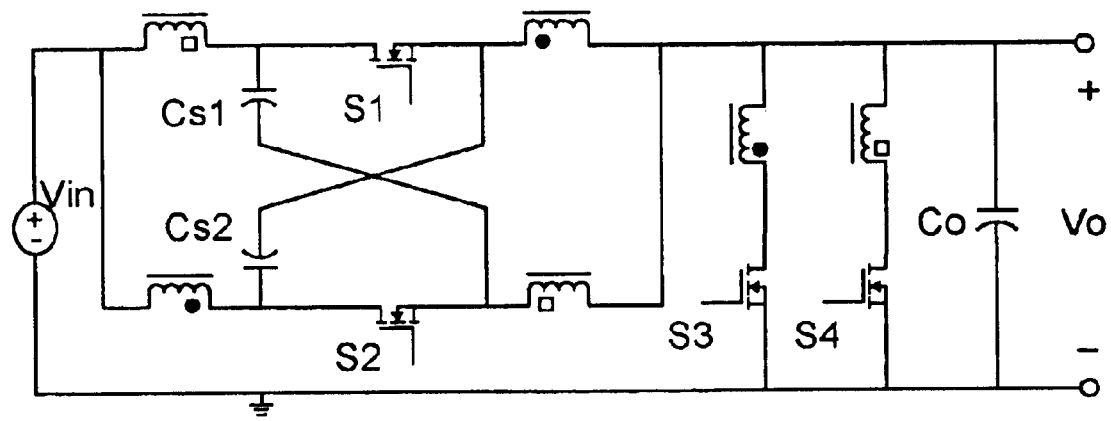

It should be noted that the improved multiphase coupled buck converter can be viewed as a simplification of the multiphase tapped-inductor buck converter discussed above in connection with FIG. 4. As shown in FIGS. 24A and 24B, by coupling the input filter inductors with the output inductors in the neighbor channels and at the same time shifting the input capacitors to the places where the capacitor voltages remain constant, the improved multiphase coupled-buck converter of FIGS. 23 and 24B is obtained from the multiphase tapped-inductor buck converter of FIG. 24A.

Figure 25:
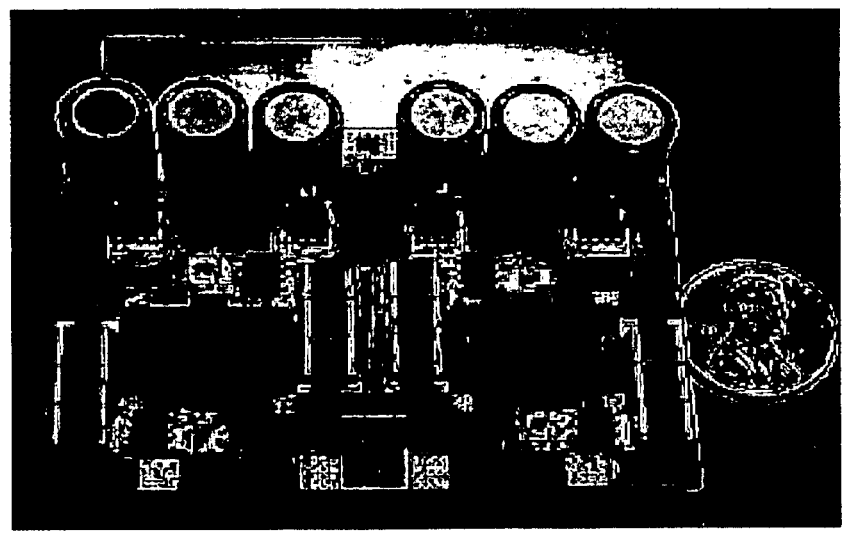
FIG. 25 is a a VRM prototype using a four phase coupled buck converter with built-in filters.

FIG. 25 is a perspective view of a prototype VRM in accordance with a preferred embodiment of the invention having a 12V-input, 1.5V/50A-output VRM prototype which was built using the improved four-phase coupled-buck converter. The prototype operates at 300 kHz. The following components were selected for the power stage: top switch—Si4884DY; bottom switch—Si4874DY; output inductance reflected to the bottom side—300 nH; input capacitors—12×22 μF, and output capacitors—6×820 μF.

Figure 26:
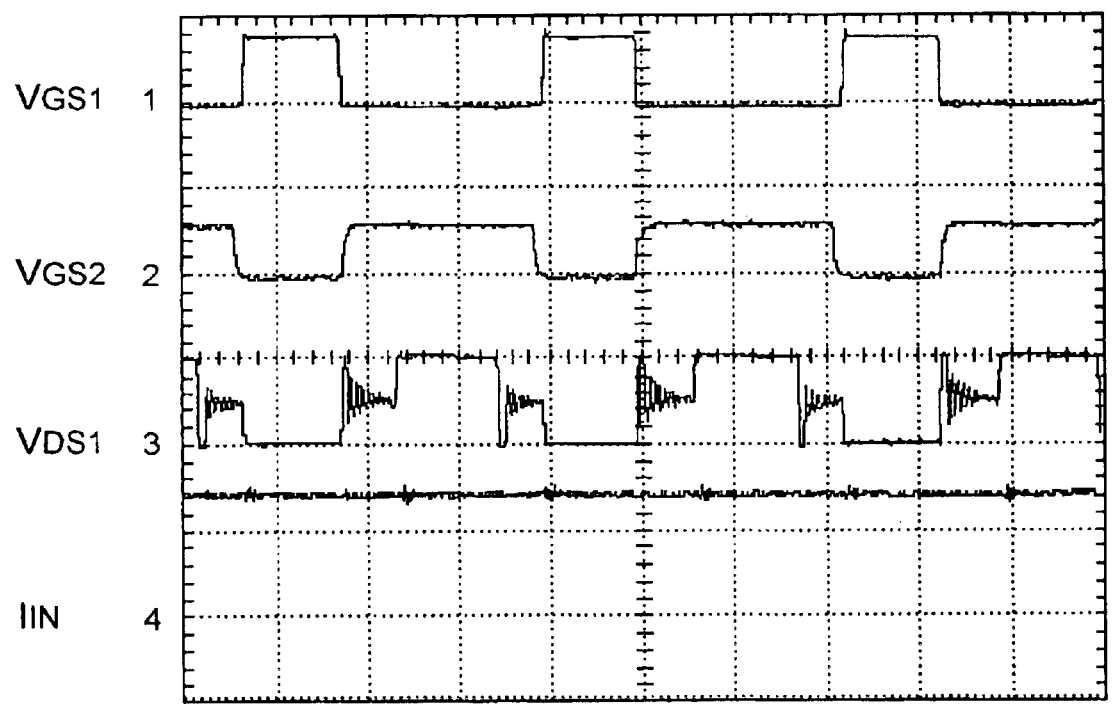
FIG. 26 illustrates voltage and current waveforms in the prototype of FIG. 25.
Figure 27:
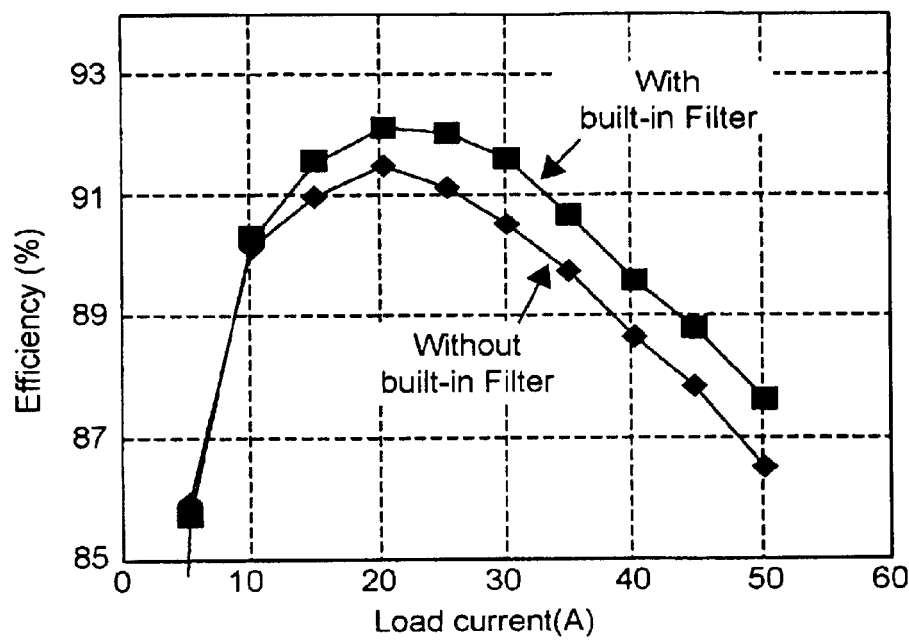
FIG. 27 is a graphical plot comparing efficiency of four phase coupled buck converters with and without filters.

FIG. 26 shows the measured waveforms at the full load for the improved four-phase coupled-buck prototype VRM of FIG. 25. Because of the existence of built-in filters, the input current is ripple-free in this improved multiphase coupled-buck converter. FIG. 27 shows the measured efficiency of the improved four-phase coupled-buck VRM. It has a 91.5% ceiling efficiency and an 87.5% full-load efficiency. Because of lower filter losses due to smooth input and output currents, the improved four phase coupled-buck VRM with built-in filters has 1% higher efficiency at full load than the four-phase coupled-buck VRM without the built-in filters and 6.5% efficiency improvement over the exemplary buck converter of FIG. 1 operating at the same input to output voltage differential.

The basic principles of the invention are not limited to direct microprocessor or chip power supplies and voltage regulation but can be extended to isolation applications between portions of any electronic apparatus or system. For example, in higher-power server-type applications, microprocessors are often driven by VRMs with 48 V input;

requiring isolation from other chips and portions of the system operating from lower input voltages. Without the isolation requirement, the proposed multiphase coupled buck converter (with or without additional or built-in filters) can be applied with a suitable turns ratio. However, isolation is often required for 48-V VRM that is used in distributed power systems. Push-pull, symmetrical half-bridge, and full-bridge converters are the suitable topologies for this application.

Figure 28:
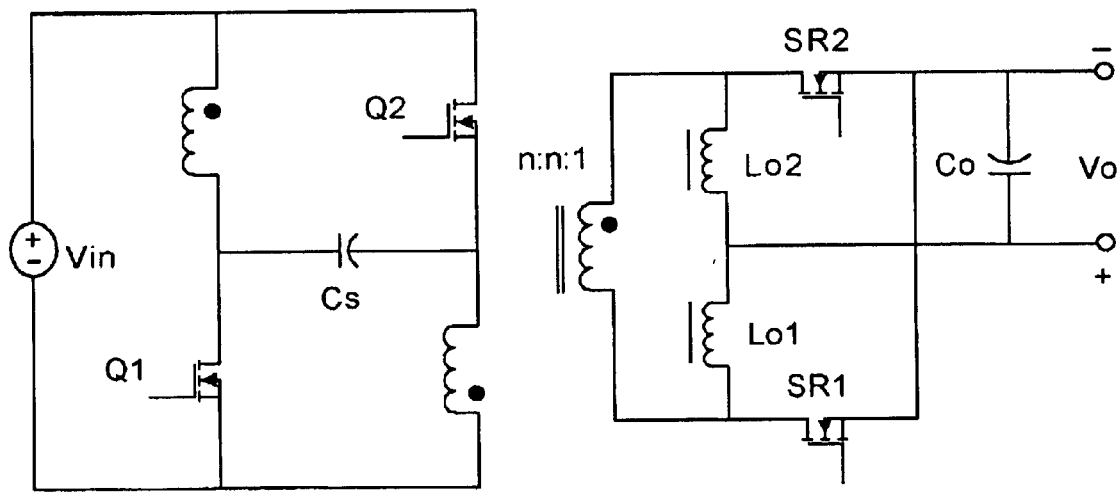
FIG. 28 is a schematic diagram of a push-pull forward converter with a current doubler rectifier.

An improved topology, referred to hereinafter as a push-pull forward converter has been proposed recently ("A Novel High-input-voltage, High Efficiency and Fast Transient Voltage Regulator Module: The Push-Pull Forward Converter" by X. Zhou et al. IEEE APEC, 1999), as shown in FIG. 28. This converter has improved transient response and increased efficiency. As shown in FIG. 28, this topology is essentially a modified push-pull converter topology With a clamp capacitor.

However, for low-voltage, high-current applications, the secondary-side power losses have a major impact on the conversion efficiency. The secondary-side losses can be reduced and efficiency improved by using a current-doubler topology, due to its simpler transformer secondary winding and halved inductor currents and transformer secondary currents.

In addition to efficiency issues, the transient response is another major concern for VRMs. The transient response of the circuit of FIG. 28 can be improved by reducing the output filter inductance so that the slew rate of the inductor current is maximized during the transients. Due to the ripple cancellation in the current-doubler rectifier, the large ripple currents generated by small inductors are canceled at the VRM output.

In summary, the push-pull forward converter with the current doubler rectifier is a suitable topology for 48-V VRM applications. The basic principles of the coupled buck converter described above can be extended to push-pull forward converter as will now be described.

Figure 29A:
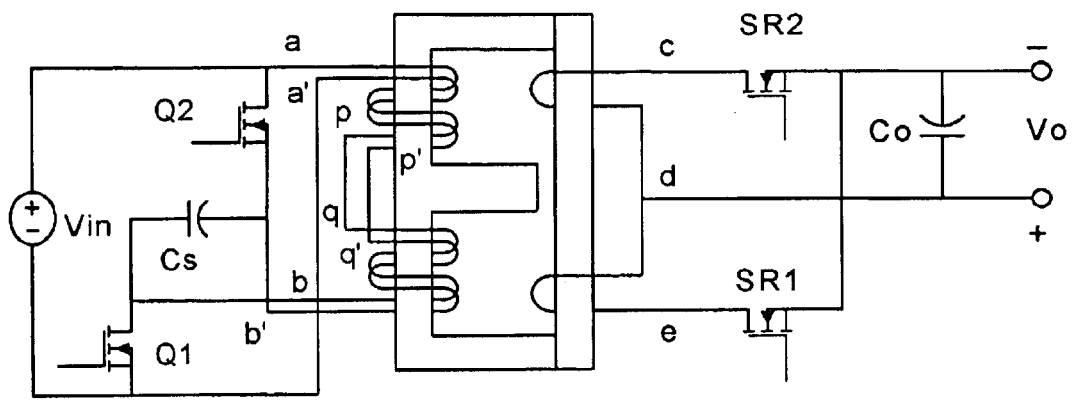
FIGS. 29A and 29B are schematic diagrams illustrating extensions of magnetic integration illustrated in FIG. 16 to the push-pull forward converter of FIG. 28, FIGS. 30A and 30B are schematic diagrams illustrating the push-pull forward converter of FIGS. 29A and 29B with a built-in filter shown in FIG. 23.
Figure 29B:
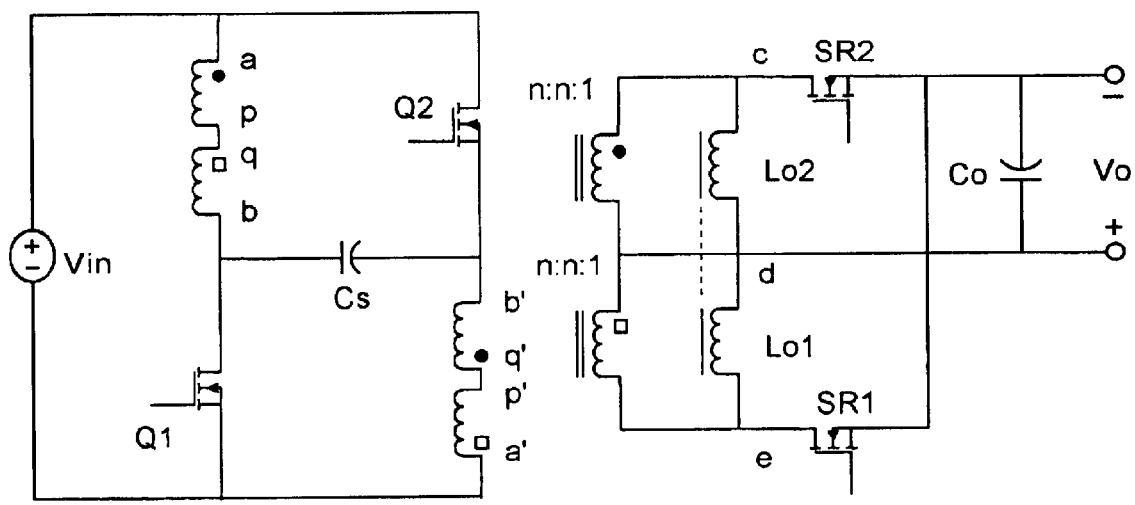

First, the concept of integrated magnetics can be extended to push-pull forward converter. FIG. 29A shows the push-pull forward converter with the proposed integrated magnetics. FIG. 29B shows its electrical equivalent circuits. The split transformer windings are shown in this circuit, which corresponds to the physical implementation.

Figure 30A:
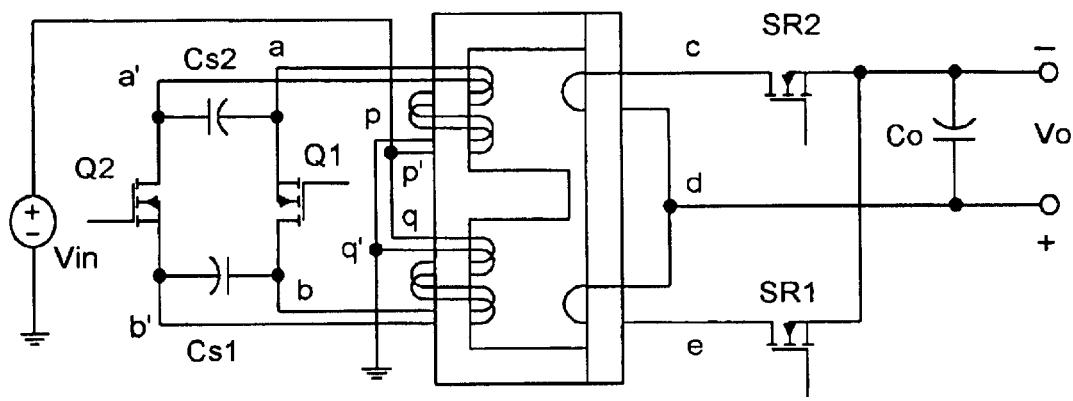
Figure 30B:
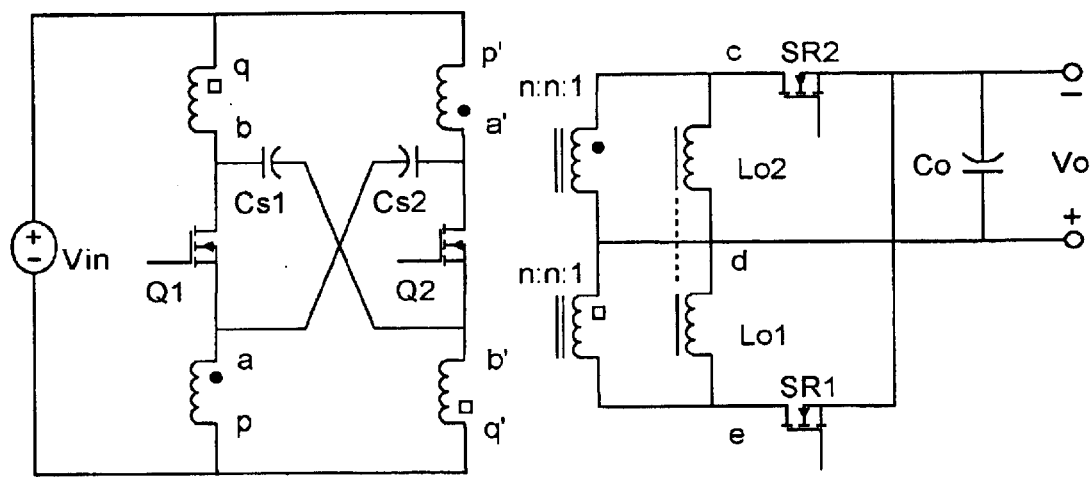

Second, the concept of built-in filter can also extended to push-pull forward converter as shown in FIG. 30. Specifically, built-in filters may be achieved by splitting the clamping capacitor Cs into two capacitors and changing the connections of the split primary windings and the primary switching devices in the same manner as discussed above.

The operation waveforms for push-pull forward converters with and without built-in filters are the same except the input current. In the push-pull forward converter including filters, the input current is near ripple free, while the converter without filters exhibits a pulsing input current.

As shown in FIGS. 29 and 30, the same integrated magnetic structure is used for both of the push-pull forward converters regardless of the inclusion or development of filters. In the push-pull forward converter using filters, the built-in input filter is formed by the leakage inductance and the clamping capacitors. The suitable leakage inductance of the transformer windings is utilized as the input filter inductor, while the clamping capacitors are serving as the filter capacitors.

Because of the existence of the built-in input filter, the input filter size can be reduced for the improved push-pull forward converter, and in some applications, no external input filter is needed. It is possible to use only a single magnetic core for entire converters.

Figure 31:
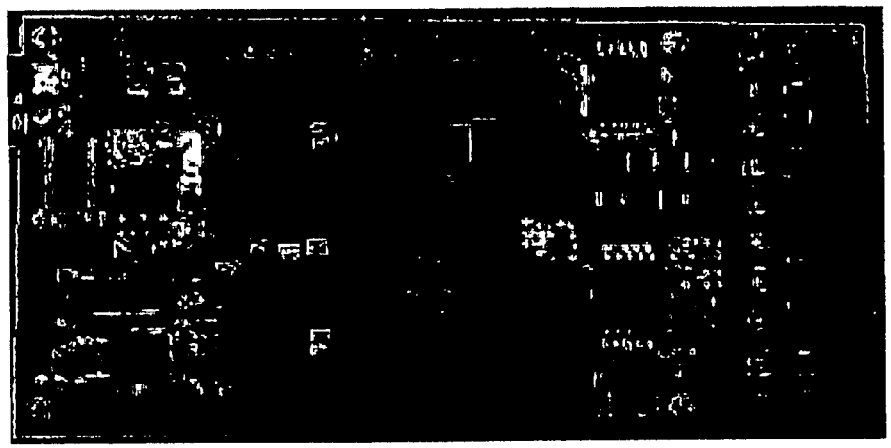
FIG. 31 is a plan view of a VRM prototype using a push-pull forward converter.

FIG. 31 shows the photograph of a 48V-input, 1.2V/70A output VRM prototype which was built employing a single magnetic push-pull forward converter. The prototypes operate at 100 kHz. The following components are selected for the power stage: primary switch—PSMN035-150B (150 v, 35 mohm); secondary switch—2xSTV16ONF03L (30V, 3 mohm); and output inductance—320 nH. The magnetic core is a combination of 1332–3173 and PLT32-3F3. The center leg has a 10 mil air gap. The windings are embedded in 2-oz 9-layer PCB. Two primary windings have eight turns each with four turns per layer. The secondary windings use a single turn with five layers paralleled. The leakage inductance measured at the primary side is about 1.4 $\mu$H. Two clamping capacitors are both 3.3 $\mu$F.

Figure 32:
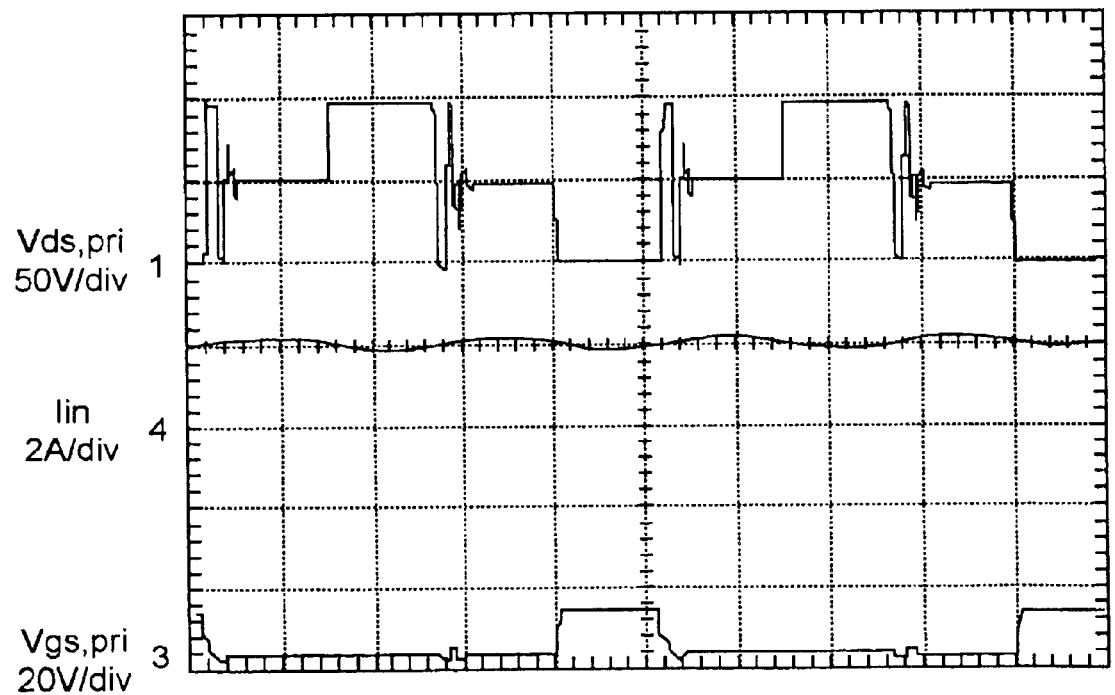
FIG. 32 is a graphical plot of voltage waveforms at full load of the prototype VRM having a single magnetic push-pull foraward converter.
Figure 33:
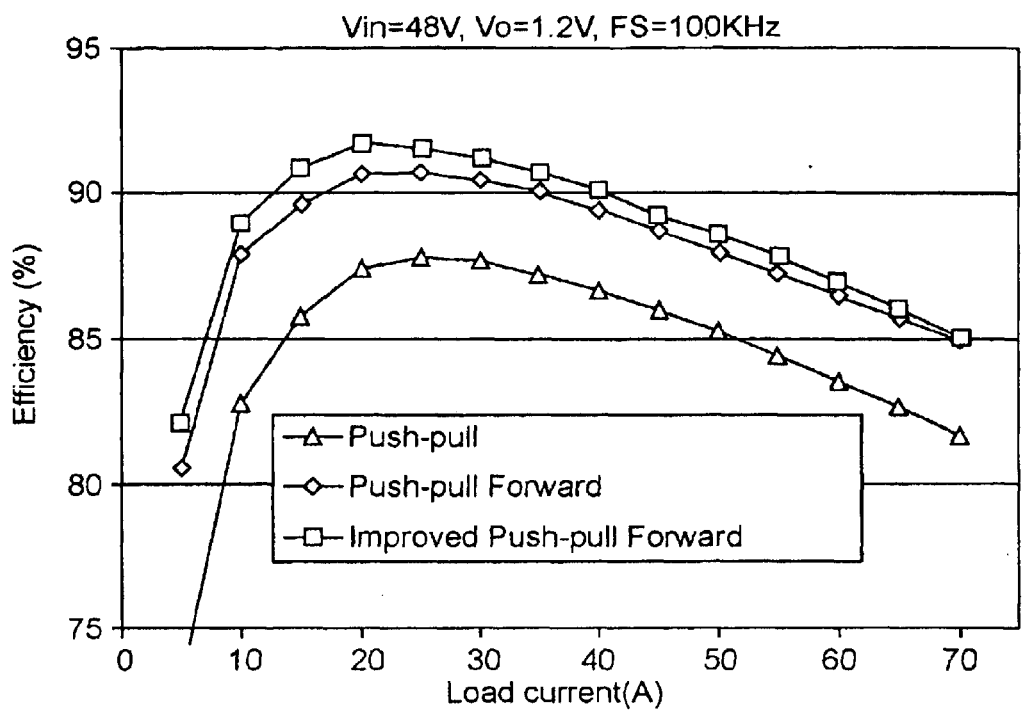
FIG. 33 is a graphical plot of VRM efficiency as a function of load.

FIG. 32 shows the experimental waveforms at full load. With the integrated input filter, the input current is smooth in the improved push-pull forward converter. FIG. 33 shows the measured efficiency. The improved push-pull forward converter achieves a 91% ceiling efficiency and an 85% full-load efficiency. Compared to the conventional push-pull converter, the push-pull forward converter in accordance with the invention has more than 3% efficiency improvement. Compared to the push-pull forward converter in accordance with the invention but without filters, the integration of the input filter also helps improve the efficiency, especially at light load.

While the VRM designs in accordance with the invention, as described above, provide substantially and significantly improved performance, especially in terms of voltage regulation, transient response and efficiency, as well as reduced component counts while providing built-in filters and compact and high power density implementations, the circuits may be somewhat more complex than is justified for some applications. Referring again to FIG. 4, the multiphase tapped-inductor buck converter (two-phase as an example) was noted as being advantageous for its simplicity and similarity of operation to the well-understood buck converter of FIG. 1, even though some problems were presented by such a topology. As will now be explained, the principles of the invention may also be applied to a tapped inductor topology which yields improvements in performance while solving noted problems.

In order to maintain the simplicity of the tapped-inductor structure, a simple passive clamp circuit is used in accordance with the invention to solve the leakage inductance problem discussed above with reference to FIG. 6, instead of adding more coupled windings. FIG. 34 shows the modified tapped-inductor converter with the proposed lossless clamp circuit.

Figure 34A:
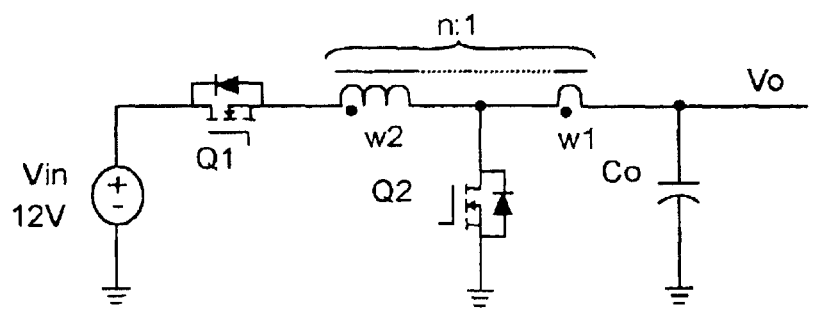
FIGS. 34A and 34B illustrate a modification of a tapped buck converter.
Figure 34B:
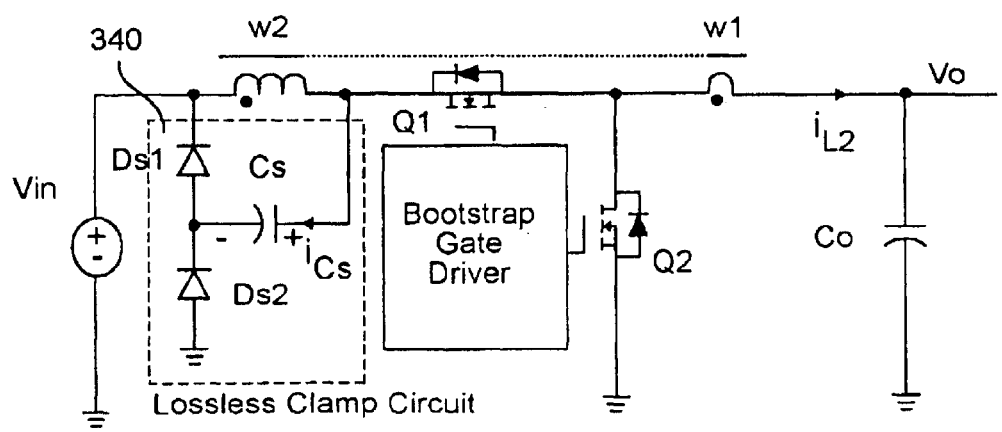

As will be observed from a comparison of FIG. 34A, which corresponds to one phase of the circuit of FIGS. 4, and 34B, it can be seen that the only change is the location of switch Q1 relative to the inductor-winding tap. Specifically, the locations of the top switch Q1 and the tapped winding w2 are exchanged and the tapped-inductor appears as two coupled and series connected inductors. Since Q1 is in series with w2, the operation principle is still the same as that described above with reference to FIGS. 4–6. However, this simple modification has many advantages.

First, the gate drive is simplified. In the tapped-inductor buck converter of FIG. 4, the driving for the top switch Q1 is complicated since the source voltage of Q1 will go to negative, which limits the application of the bootstrap gate driver. In the modified version of FIG. 34B, the same simple bootstrap gate driver for the synchronous buck converter as discussed in connection with FIG. 7 can still be used since Q1 and Q2 have the same locations.

Figure 35:
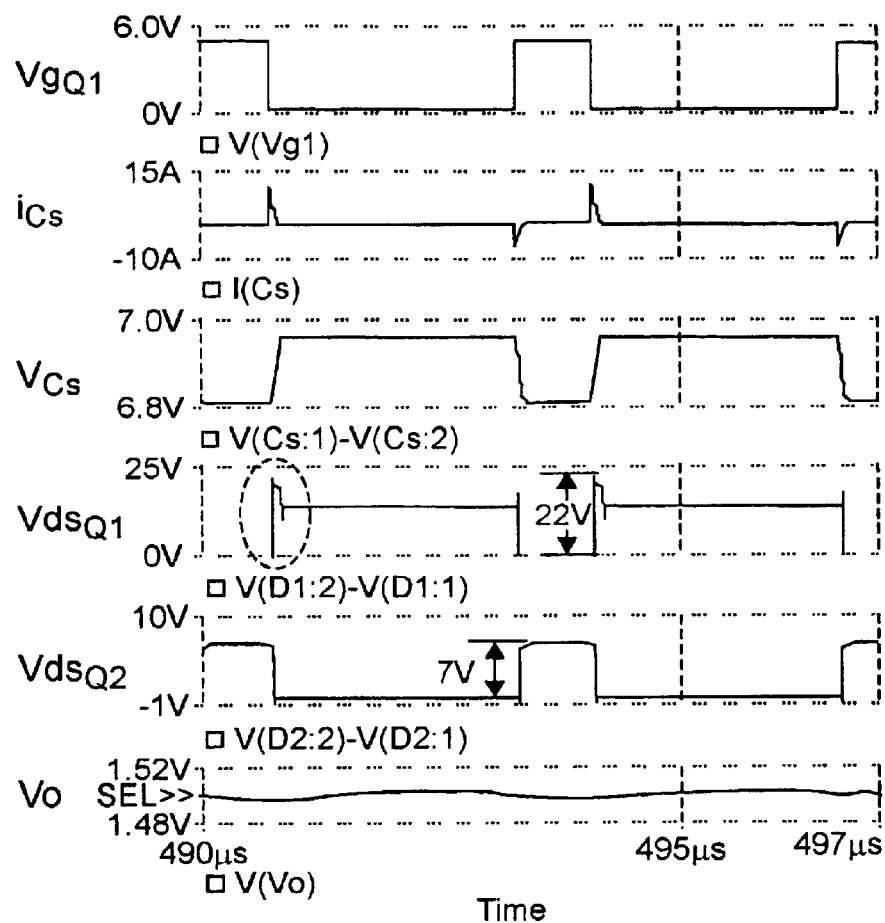
FIGS. 35 and 36 illustrate simulated and experimental voltage and current waveforms for a lossless clamp circuit as illustrated in FIG. 34B, respectively, FIG. 37 illustrate an efficiency comparison for the lossless clamp circuit of FIG. 34B, FIGS. 38A and 38B illustrate discontinuous output current in VRM topologies with two phase interleaving.

Second, another significant benefit is the simple implementation of a lossless clamp circuit 340. In FIG. 34B, Cs, Ds1 and Ds2 form the clamp circuit. The operation principle is simple: when Q1 is turned off, Cs absorbs the inductor leakage energy through Ds1 and clamps the voltage spike across Q1. Then the extra energy is recovered to output through Ds2 when Q1 is turned on. FIG. 35 shows the simulation waveforms for the circuit of FIG. 34B.

It will be observed from FIG. 35 that perfect voltage clamping effect is achieved for for the top switch Q1. As a result, 30V MOSFET can still be used for good performance but will not be subject to damage. Since very narrow current spikes go through the diodes Ds1 and Ds2, and several $\mu f$ capacitance is large enough to handle the leakage energy, the clamp circuit is very small and low cost as well as lossless.

Figure 36:
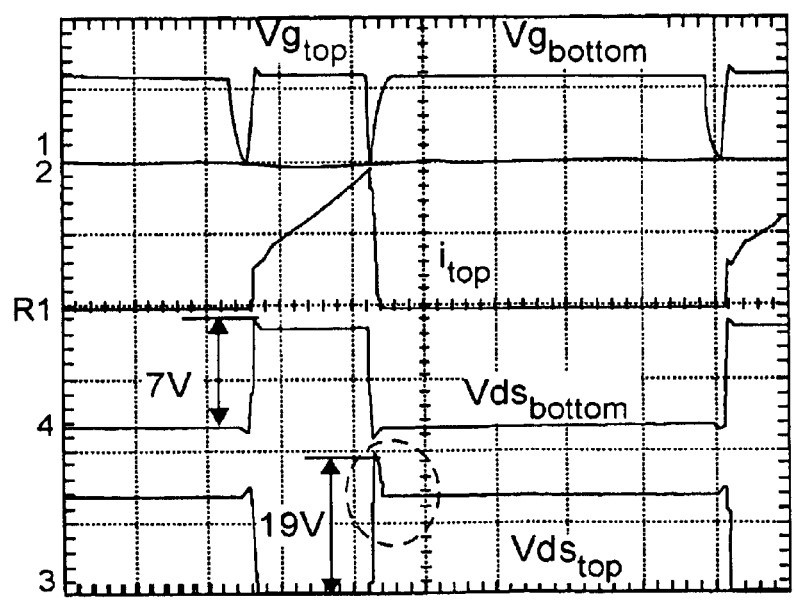
Figure 37:
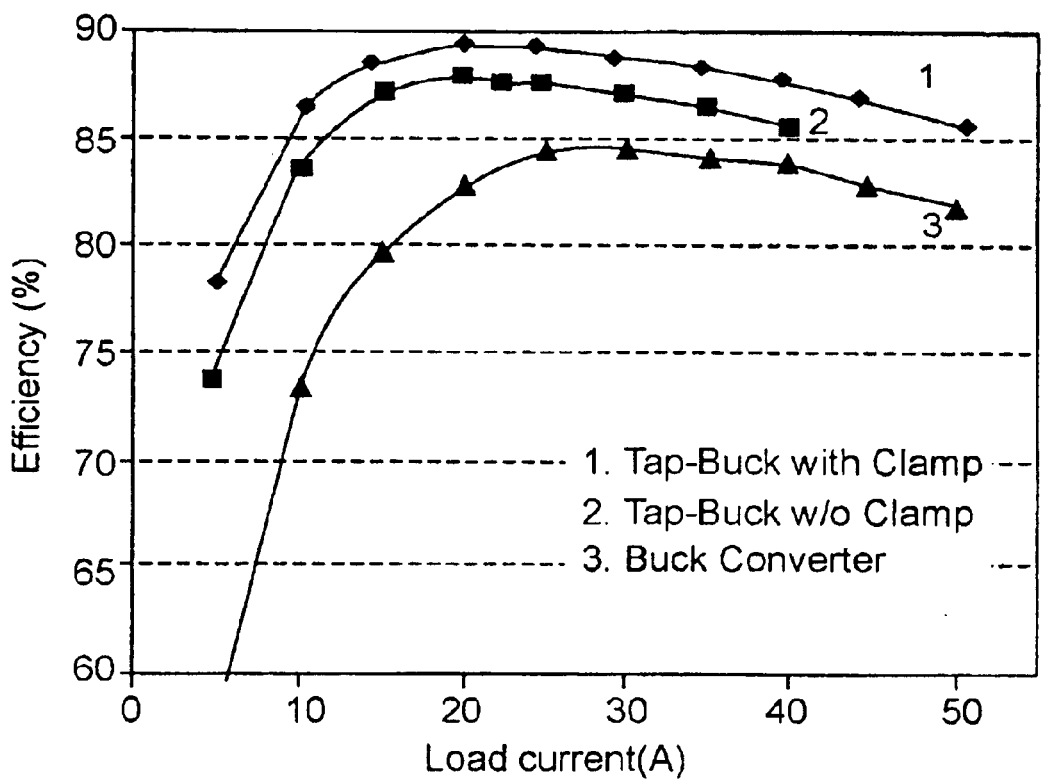

FIG. 36 shows the experimental waveforms for a 12V-input, 1.5V output, four-phase interleaved tapped-inductor buck converter with the lossless clamp circuit. The voltage stress of the top switch is well clamped to be lower than 20V as can be seen from a comparison of FIG. 36 and FIG. 5 in the regions circled therein. FIG. 37 shows the efficiency improvement with the lossless clamp circuit compared with the conventional four-phase interleaved buck converter design and the tapped-inductor buck converter without the clamp circuit. The switching frequency is 300 KHz and the output filter inductance is 300 nH. Without the clamp circuit, the load can only be pushed to 40A for the original tapped-inductor buck converter. High voltage spike damages the top switch at full load. With the clamp circuit, the tapped-inductor buck converter can achieve 86% efficiency at full load, with 4% improvement over the buck converter without the clamp circuit.

Figure 38A:
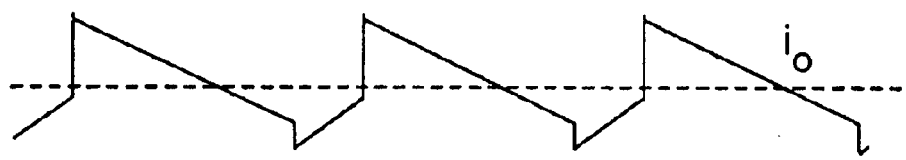
Figure 38B:
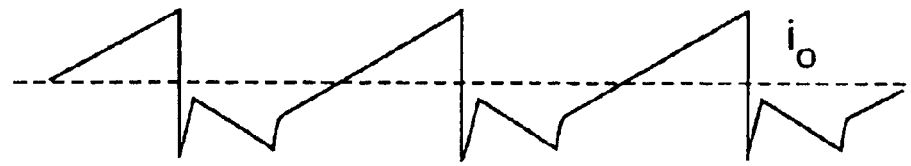

As described above, active clamp or passive clamp circuits can solve the leakage inductance and voltage spike problem in both the coupled-buck and the tapped buck converter VRMs. However, these circuits are disadvantageous in terms of discontinuous output currents and right half plane (RHP) zeros in their small signal models. The current jumping and dropping in every switching cycle shown in FIG. 38 will not only increase the output voltage steady-state ripple, but will also decrease the reliability of the output capacitors. The RHP zero may negatively impact the system design in regard to transient response and stability.

Figure 39:
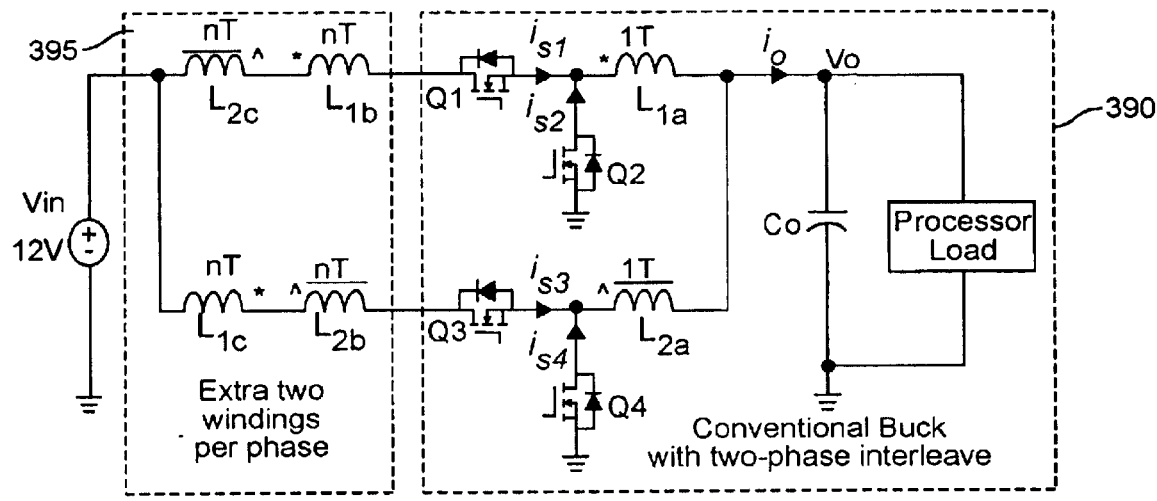
FIG. 39 is a schematic diagram of a variation of windings of a coupled buck converter in accordance with the invention.

As a result, it is preferred to provide a topology which maintains all the benefits of the previous topologies based on coupled windings but has continuous output current and no RHP zero. A circuit having these advantages is shown in FIG. 39. In the right block 390, it the circuit is a buck converter with two phase interleaving as shown in FIG. 1 and discussed above. Two additional coupled windings for each phase are shown in the left block 395. The first winding in each phase is coupled to the inductor in its phase, and the second winding is coupled to the inductor in another phase. For example, L1a, L1b and L1, are coupled together. Both coupled windings have turns ratio of n. The coupling way is shown as in FIG. 39 with "*" and "^" marks. With this modification, the exemplary buck converter of FIG. 1 is modified to achieve avoidance of discontinuous output current and RHP zeroes.

Figure 40:
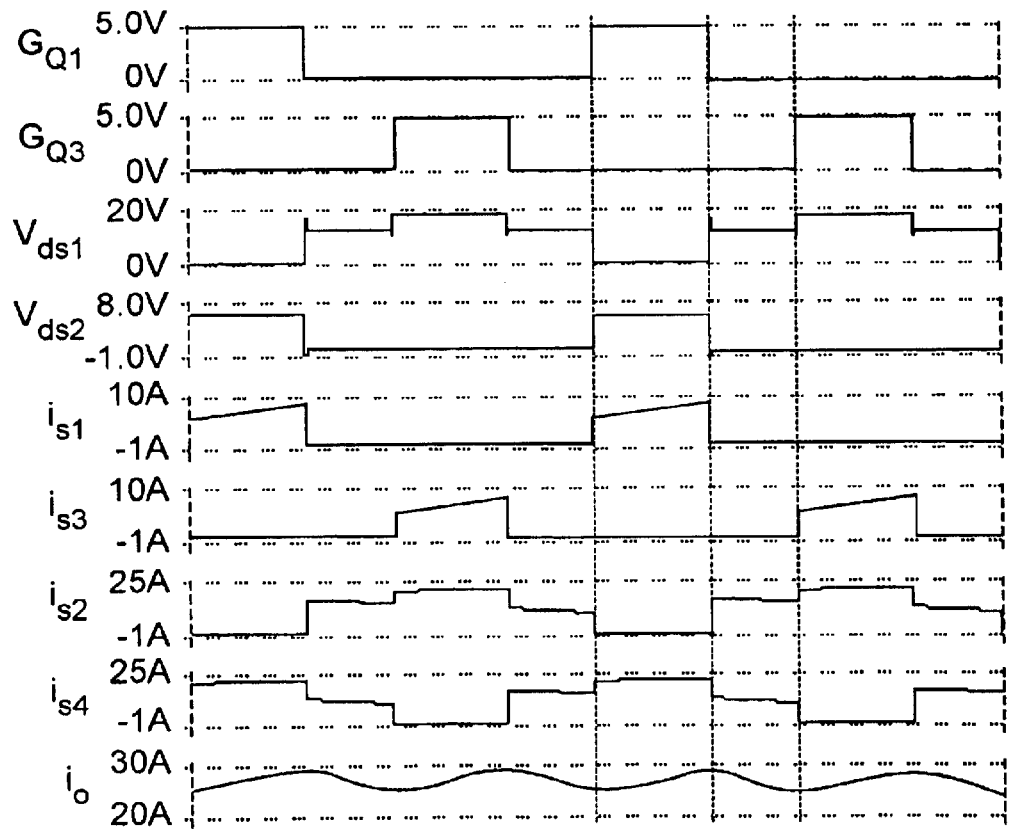
FIG. 40 illustrates simulated voltage and current waveforms for the circuit of FIG. 39

The control principle of the converter of FIG. 39 is the same as that of a two-phase interleaved buck converter. In the same phase, the top and bottom switches are controlled in a complementary fashion. For the different phases, they are controlled with 180 degree phase shift. As a result, some conventional two-phase pulse width modulation (PWM) controllers can be used. FIG. 40 shows a simulation of the key operation waveforms. According to the steady-state operation waveforms, the DC voltage gain of the proposed winding-coupled buck converter can be derived as follows:

$$V_O/V_{IN}=D/(n+1).$$

The preceding analysis of the circuit operation shows that this proposed circuit operates similar to a push-pull current doubler with transformer turns ratio of n+1:1. Since its final equivalent circuit is still a buck converter, this topology maintains all the same attributes. The output current is continuous as shown in FIG. 40 and there is no RHP zero.

Since this circuit operates in a manner similar to the push-pull converter with isolated transformer as discussed above, the integrated magnetics structure discussed above in connection with FIGS. 14–21 can also be used for this topology. Furthermore, this winding structure is simpler: n-turn windings can achieve turns ratio of n+1:1. This is a significant benefit for the 12V-input VRM application, since the additional windings can use only a single turn to double the duty cycle and halve the switching current and the bottom switch voltage stress. The isolated push-pull converter must have additional two-turn windings provided in a similarly simple and convenient manner to achieve the same function. Another major benefit of the circuit of FIG. 39 is the simplicity of the gate drive and control. All the drivers and controllers for a conventional multi-phase buck converter can be used directly.

Figure 41:
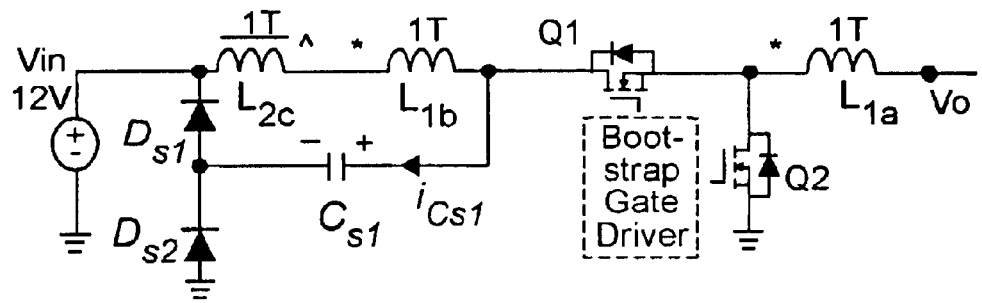
FIG. 41 is a schematic diagram of a preferred form of a lossless clamp circuit for a winding-coupled buck converter.
Figure 42:
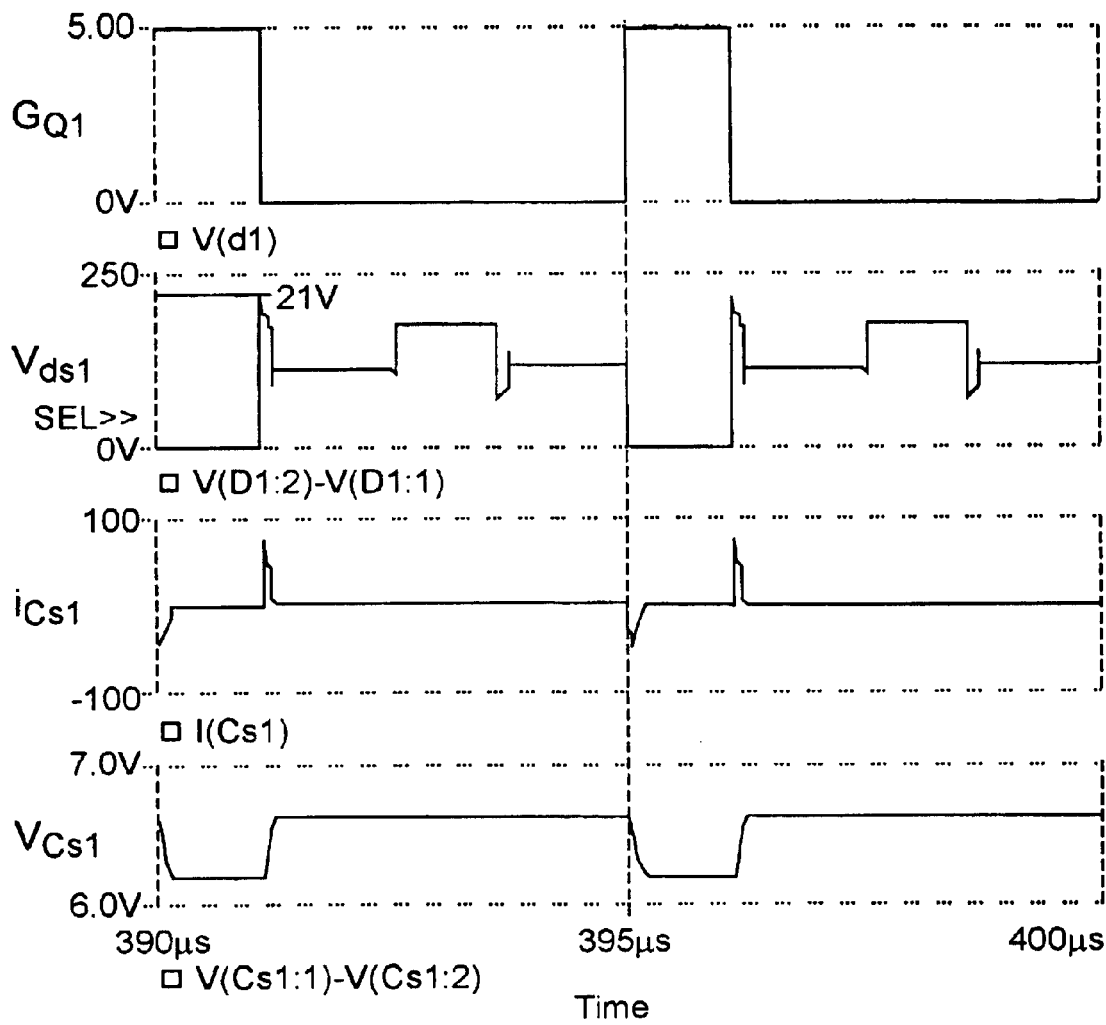
FIGS. 42 and 43 illustrate simulated and experimental voltage and current waveforms for the circuit of FIG. 41.
Figure 43:
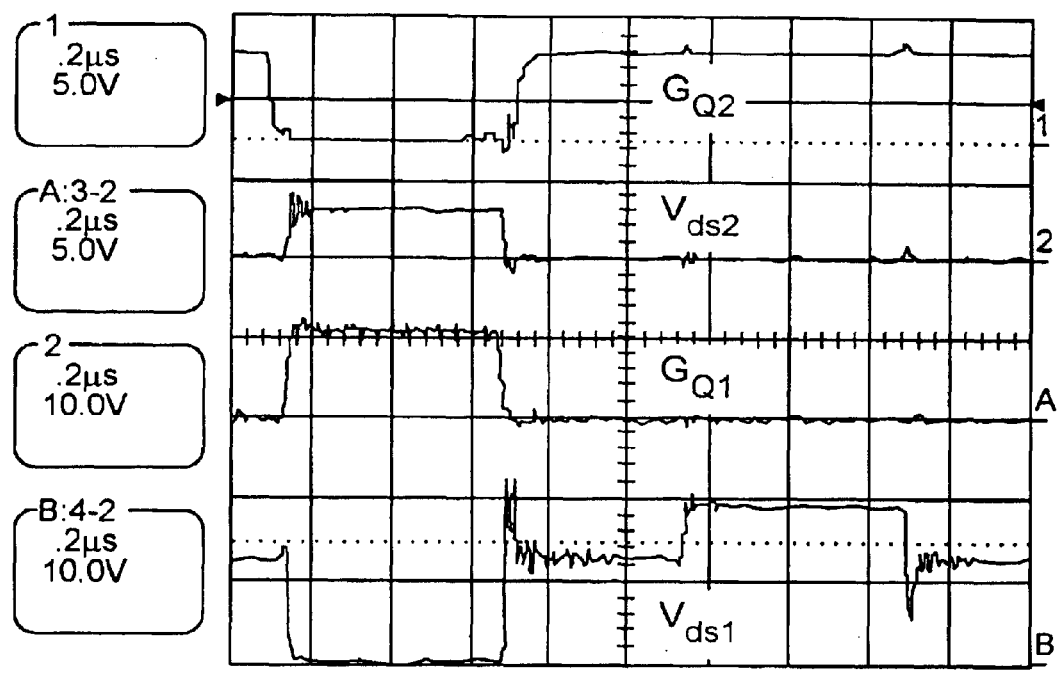

The same types of clamp circuit discussed above can also be used to clamp the voltage spike in the winding coupled-buck converter. FIG. 41 shows one phase of such a circuit. The operation principle is the same as in the tapped-inductor buck converter. FIG. 42 shows the simulation results. FIG. 43 shows corresponding experimentally observed operation waveforms. It can be seen from these waveforms that the voltage stress of the top switch is perfectly clamped to 22V.

Figure 44:
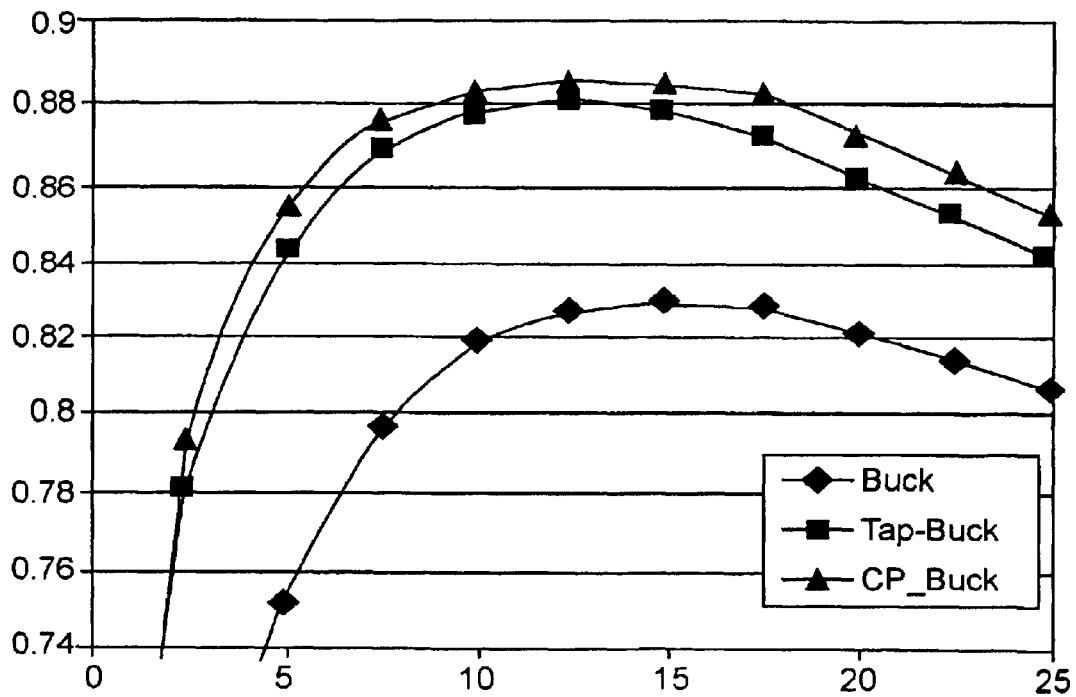
FIG. 44 is a perspective view of a high power density VRM prototype in accordance with the invention.
Figure 45:
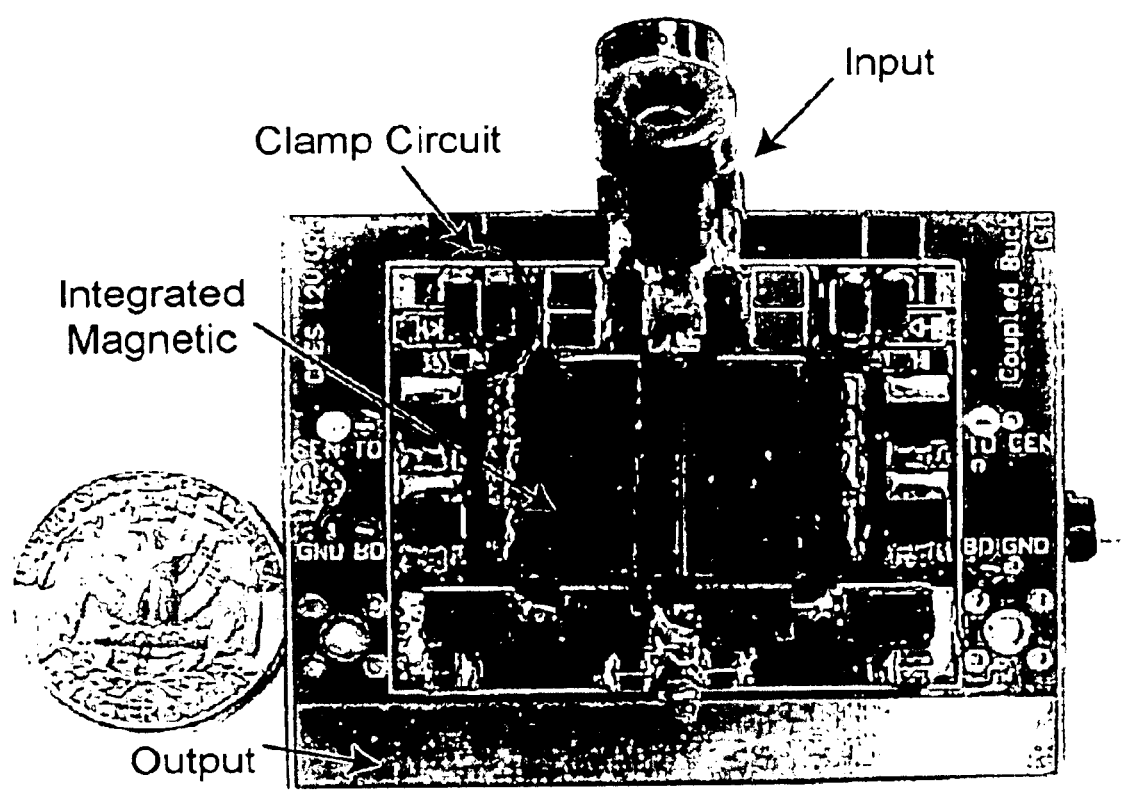
FIG. 45 is a perspective view of a prototype VRM in accordance with the invention having a power density of more than 50 w/in$^3$.

FIG. 44 shows the efficiency improvement of the embodiment of FIG. 41 at 1 MHz compared with the buck and tapped-inductor converter in the two-phase 12V to 1.5V/25A VRM designs. At full load, about 5% efficiency improvement is achieved relative to the buck converter, and 1% efficiency improvement than the tapped-inductor buck converter with clamp circuit. More than 85% efficiency can be achieved with the proposed topology at 1 MHz switching frequency. FIG. 45 shows the small size of the prototype, which has more than 50 w/in$^3$ power density.

In view of the foregoing, it is seen that the invention provides much improved VRM performance in terms of voltage regulation, ripple voltage, efficiency and transient response particularly for large differentials of input and output voltage. VRM designs in accordance with the invention can be implemented at small size and, in some cases, with reduced component counts while achieving built-in filters for improved performance, particularly through integrated magnetic structures of designs which facilitate fabrication.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A voltage regulator circuit including
   a plurality of branches switched in a complementary manner to define a plurality of phases,
   an inductor connected in series with an output of each said phase,
   a clamping circuit connected to a tap of said inductor and,
   means for providing coupling between respective inductors of respective neighboring ones of said plurality of phases.

2. A circuit as recited in claim 1, wherein said clamping circuit is a passive clamping circuit.

3. A circuit as recited in claim 1, wherein said clamping circuit is an active clamping circuit.

4. A circuit as recited in claim 1, wherein said clamping circuit is a lossless clamping circuit.

5. A circuit as recited in claim 1, wherein said means for providing coupling includes formation of portions of said inductors for respective neighboring phases as coils on a common core.

6. A circuit as recited in claim 5, wherein said core is an E-I core having an air gap in a central leg.

7. A circuit as recited in claim 5, wherein said coils formed on a common core are in the form of a transformer and inductors.

8. A circuit as recited in claim 7, further including
   a push-pull forward converter, and
   a current doubler rectifier circuit.

9. A circuit as recited in claim 1, wherein portions of said inductors, said means for coupling and said clamping circuit are configured as filters.

10. A circuit as recited in claim 1, wherein said inductors are configured as tapped inductors.

11. An electronic device comprising, in combination,
    an integrated circuit chip and a voltage regulator module, wherein said voltage regulator module includes
      a plurality of branches switched in a complementary manner to define a plurality of phases,
      an inductor connected in series with an output of each said phase,
      a clamping circuit connected to a tap of said inductor, and
      means for proving coupling between respective inductors of respective ones of said plurality of phases.

12. A device as recited in claim 11, wherein said clamping circuit is a passive clamping circuit.

13. A device as recited in claim 11, wherein said clamping circuit is an active clamping circuit.

14. A device as recited in claim 11, wherein said clamping circuit is a lossless clamping circuit.

15. A device as recited in claim 11, wherein said means for providing coupling includes formation of portions of said inductors for respective neighboring phases as coils on a common core.

16. A device as recited in claim 15, wherein said core is an E-I core having an air gap in a central leg.

17. A device as recited in claim 15, wherein said coils formed on a common core are in the form of a transformer and inductors.

18. A device as recited in claim 17, further including
    a push-pull forward converter, and
    a current doubler rectifier circuit.

19. A device as recited in claim 11, wherein portions of said inductors, said means for coupling and said clamping circuit are configured as filters.

20. A device as recited in claim 11, wherein said inductors are configured as tapped inductors.

21. A device as recited in claim 11, wherein said integrated circuit device is a microprocessor.

22. A voltage regulator circuit comprising
    an inductor connected in series with an output, said inductor having first and second inductively coupled windings,
    a first switch connected in series between said first and second inductively coupled windings,
    a second switch connected between a node between said first switch and said second inductively coupled winding and a reference voltage, and
    a lossless clamp circuit connected across said first inductively coupled winding and said reference voltage.

23. A circuit as recited in claim 22 wherein said lossless clamp circuit comprises
    two series connected diodes, and
    a capacitor.

24. A circuit as recited in claim 22 having
    a plurality of branches switched in a complementary manner to define a plurality of phases,
    means for proving coupling between respective inductors of respective ones of said plurality of phases.

25. An electronic device comprising, in combination,
    an integrated circuit chip and a voltage regulator module, wherein said voltage regulator module includes
      an inductor connected in series with an output, said inductor having first and second inductively coupled windings,
      a first switch connected in series between said first and second inductively coupled windings,
      a second switch connected between a node between said first switch and said second inductively coupled winding and a reference voltage, and
      a lossless clamp circuit connected across said first inductively coupled winding and said reference voltage.

26. A device as recited in claim 25 wherein said lossless clamp circuit comprises
    two series connected diodes, and
    a capacitor.

27. A device as recited in claim 25 having
    a plurality of branches switched in a complementary manner to define a plurality of phases,
    means for proving coupling between respective inductors of respective ones of said plurality of phases.

* * * * *